United States Patent
Blau-McCandliss et al.

(10) Patent No.: US 11,361,760 B2
(45) Date of Patent: Jun. 14, 2022

(54) VARIABLE-SPEED PHONETIC PRONUNCIATION MACHINE

(71) Applicant: Learning Squared, Inc., Sunnyvale, CA (US)

(72) Inventors: Vera Blau-McCandliss, Stanford, CA (US); Bruce Donald McCandliss, Stanford, CA (US)

(73) Assignee: Learning Squared, Inc., Sunnyvale, CA (US)

(*) Notice: Subject to any disclaimer, the term of this patent is extended or adjusted under 35 U.S.C. 154(b) by 166 days.

(21) Appl. No.: 16/219,659

(22) Filed: Dec. 13, 2018

(65) Prior Publication Data
US 2020/0193975 A1 Jun. 18, 2020

(51) Int. Cl.
*G10L 15/187* (2013.01)
*G06F 3/0486* (2013.01)
(Continued)

(52) U.S. Cl.
CPC .......... *G10L 15/187* (2013.01); *G06F 3/0486* (2013.01); *G06F 3/04842* (2013.01); *G10L 13/10* (2013.01); *G10L 2013/105* (2013.01)

(58) Field of Classification Search
CPC .... G10L 15/18; G10L 15/187; G06F 3/04842
See application file for complete search history.

(56) References Cited

U.S. PATENT DOCUMENTS 3,715,812 A * 2/1973 Novak ............... G09B 19/08
                                                      434/170
5,182,557 A * 1/1993 Lang ................ B25J 9/0003
                                                      341/20

(Continued)

FOREIGN PATENT DOCUMENTS

CN   113302672 A    8/2021
IN   202117030770  12/2021
(Continued)

OTHER PUBLICATIONS

"International Application Serial No. PCT US2019 064962, International Search Report dated Mar. 24, 2020", 3 pages.
(Continued)

*Primary Examiner* — Jakieda R Jackson
(74) *Attorney, Agent, or Firm* — Schwegman Lundberg & Woessner, P.A.

(57) ABSTRACT

A machine causes a touch-sensitive screen to present a graphical user interface that depicts a slider control aligned with a word that includes a first alphabetic letter and a second alphabetic letter. A first zone of the slider control corresponds to the first alphabetic letter, and a second zone of the slider control corresponds to the second alphabetic letter. The machine detects a touch-and-drag input that begins within the first zone and enters the second zone. In response to the touch-and-drag input beginning within the first zone, the machine presents a first phoneme that corresponds to the first alphabetic letter, and the presenting of the first phoneme may include audio playback of the first phoneme. In response to the touch-and-drag input entering the second zone, the machine presents a second phoneme that corresponds to the second alphabetic letter, which may include audio playback of the second phoneme.

19 Claims, 11 Drawing Sheets

(51) Int. Cl.
*G10L 13/10* (2013.01)
*G06F 3/04842* (2022.01)

(56) References Cited

U.S. PATENT DOCUMENTS

| | | | | |
|---|---|---|---|---|
| 5,451,163 | A * | 9/1995 | Black | G09B 5/065 |
| | | | | 434/167 |
| 5,499,921 | A * | 3/1996 | Sone | G09B 15/00 |
| | | | | 434/307 A |
| 5,878,396 | A * | 3/1999 | Henton | G10L 13/00 |
| | | | | 704/E15.041 |
| 5,995,119 | A * | 11/1999 | Cosatto | G06T 13/40 |
| | | | | 345/473 |
| 6,307,576 | B1 * | 10/2001 | Rosenfeld | G06T 13/40 |
| | | | | 704/E21.02 |
| 7,554,542 | B1 * | 6/2009 | Ferraro | G06T 15/503 |
| | | | | 345/581 |
| 8,070,492 | B1 * | 12/2011 | McKinnis | G09B 17/02 |
| | | | | 434/178 |
| 2003/0137515 | A1 * | 7/2003 | Cederwall | G06T 13/40 |
| | | | | 345/473 |
| 2004/0029083 | A1 * | 2/2004 | Coleman | G10L 13/00 |
| | | | | 434/167 |
| 2004/0111271 | A1 * | 6/2004 | Tischer | G10L 13/033 |
| | | | | 704/277 |
| 2006/0074690 | A1 * | 4/2006 | Xu | G10L 21/06 |
| | | | | 704/276 |
| 2007/0041365 | A1 * | 2/2007 | Nejah | H04L 12/66 |
| | | | | 370/352 |
| 2007/0208567 | A1 * | 9/2007 | Amento | G10L 15/22 |
| | | | | 704/270 |
| 2007/0248938 | A1 * | 10/2007 | Ronald | G09B 17/003 |
| | | | | 434/178 |
| 2008/0180305 | A1 * | 7/2008 | McRae | G06F 3/01 |
| | | | | 341/176 |
| 2010/0250256 | A1 * | 9/2010 | Hiraishi | G06T 13/205 |
| | | | | 345/473 |
| 2011/0060585 | A1 * | 3/2011 | Oh | G06F 3/0237 |
| | | | | 704/9 |
| 2012/0040315 | A1 * | 2/2012 | King | G10L 15/22 |
| | | | | 434/178 |
| 2012/0188262 | A1 * | 7/2012 | Rabii | G09G 5/393 |
| | | | | 345/534 |
| 2014/0029778 | A1 * | 1/2014 | Bartunek | H04R 25/30 |
| | | | | 381/317 |
| 2014/0234809 | A1 | 8/2014 | Colvard | |
| 2015/0112687 | A1 * | 4/2015 | Bredikhin | G10L 13/02 |
| | | | | 704/260 |
| 2015/0356349 | A1 * | 12/2015 | Govindarajeswaran | |
| | | | | G06V 40/164 |
| | | | | 382/103 |
| 2016/0188184 | A1 * | 6/2016 | Garcia, Jr | G06F 3/0482 |
| | | | | 715/780 |
| 2017/0069220 | A1 * | 3/2017 | Thornton | G09B 5/06 |
| 2017/0330479 | A1 * | 11/2017 | Bowman | G09B 5/125 |
| 2018/0033335 | A1 | 2/2018 | Hancock | |
| 2018/0190269 | A1 * | 7/2018 | Lokeswarappa | G09B 19/06 |
| 2018/0197433 | A1 | 7/2018 | Tavares | |
| 2018/0268732 | A1 * | 9/2018 | Thiel | G09B 5/02 |
| 2018/0300101 | A1 * | 10/2018 | Liu | G06F 3/165 |
| 2018/0361248 | A1 * | 12/2018 | Nomura | A63F 13/847 |
| 2019/0088018 | A1 * | 3/2019 | Shenton | A63F 13/87 |
| 2019/0095775 | A1 * | 3/2019 | Lembersky | G06N 20/00 |

FOREIGN PATENT DOCUMENTS

| | | |
|---|---|---|
| KR | 20110097578 | 8/2011 |
| KR | 20140122172 | 10/2014 |
| WO | WO-2020123297 A1 | 6/2020 |

OTHER PUBLICATIONS

"International Application Serial No. PCT US2019 064962, Written Opinion dated Mar. 24, 2020", 5 pages.

"International Application Serial No. PCT/US2019/064962, International Preliminary Report on Patentability dated Apr. 1, 2021", 5 pgs.

"European Application Serial No. 19896169,0, Extended European Search Report dated Dec. 22, 2021", 8 pgs.

* cited by examiner

VARIABLE-SPEED PHONETIC PRONUNCIATION MACHINE

TECHNICAL FIELD

The subject matter disclosed herein generally relates to the technical field of special-purpose machines that facilitate teaching or learning of reading skills, including software-configured computerized variants of such special-purpose machines and improvements to such variants, and to the technologies by which such special-purpose machines become improved compared to other special-purpose machines that facilitate teaching or learning of reading skills. Specifically, the present disclosure addresses systems and methods to facilitate variable-speed phonetic pronunciation of alphabetic letters (e.g., variable-speed pronunciation of a word made of multiple alphabetic letters) and words composed thereof.

BACKGROUND

A machine may be configured to interact with one or more users of the machine (e.g., a computer or other device) by presenting an exercise that teaches one of more reading skills to the one or more users or otherwise guides the one or more users through practice of the one or more reading skills. For example, the machine may present an alphabetic letter (e.g., the letter "A" or the letter "B") within a graphical user interface (GUI), play an audio or video recording of an actor pronouncing the presented alphabetic letter, and then prompt a user (e.g., a child who is learning to read) to also pronounce the presented alphabetic letter.

BRIEF DESCRIPTION OF THE DRAWINGS

Some embodiments are illustrated by way of example and not limitation in the figures of the accompanying drawings.

DETAILED DESCRIPTION

Figure 1:
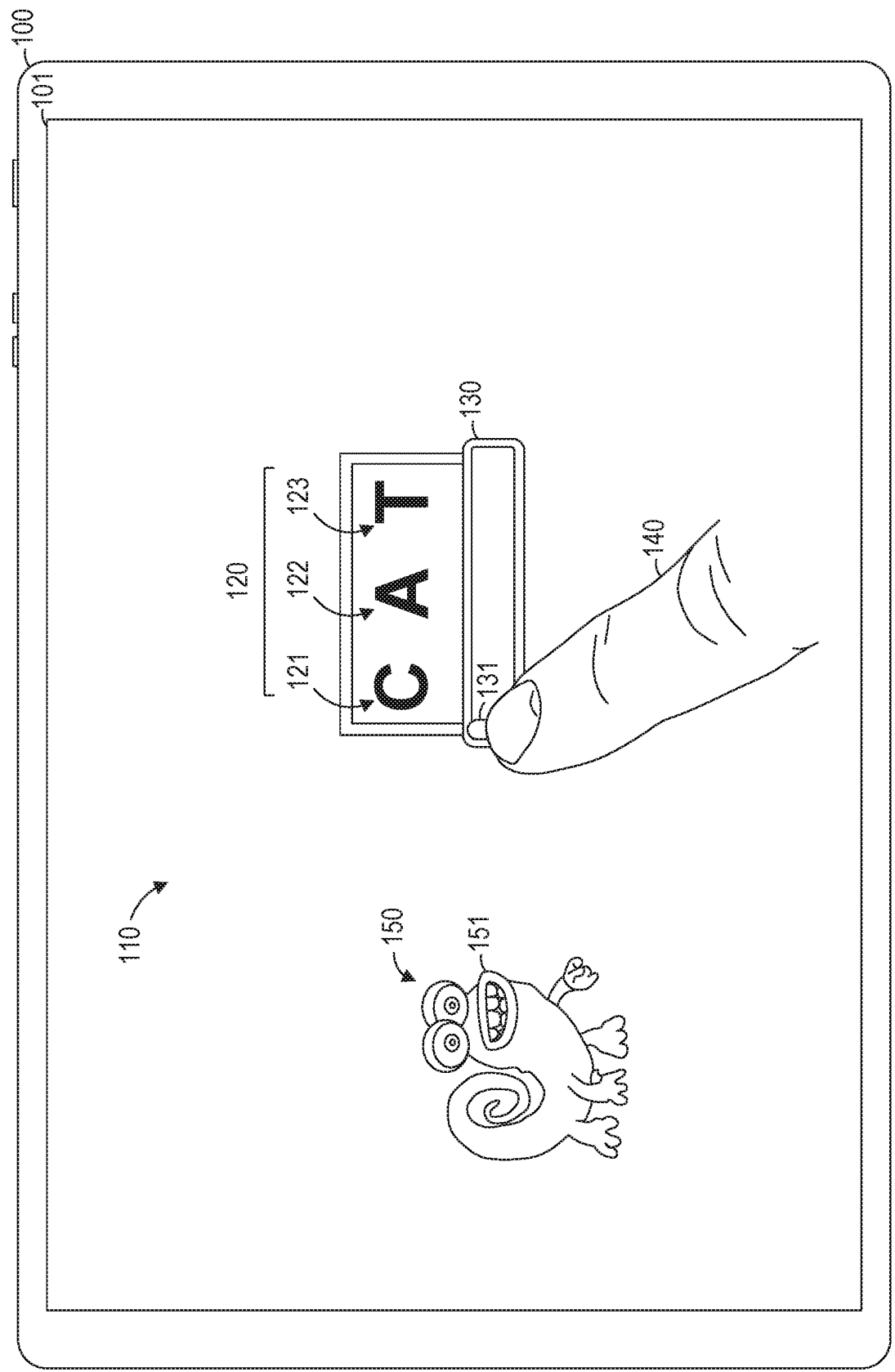
FIGS. 1-5 are face views of a machine with a touch-sensitive display screen on which a GUI suitable for variable-speed phonetic pronunciation is presented, according to some example embodiments.

Example methods (e.g., algorithms) facilitate variable-speed pronunciation of phonemes by a machine, and example systems (e.g., special-purpose machines configured by special-purpose software) are configured to facilitate (e.g., perform) variable-speed pronunciation of phonemes. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject may be practiced without these specific details.

A machine may be specially configured (e.g., by suitable hardware modules, software modules, or a combination of both) to behave or otherwise function as a variable-speed phonetic pronunciation machine that, for example, pronounces the phonemes of a word at a pronunciation speed that varies in accordance with a variable-speed user input, such as a touch-and-drag input on a touch-sensitive display screen. In accordance with the systems and methods discussed herein, the variable-speed phonetic pronunciation machine is technically improved compared to other machines that also pronounce phonemes but lack the behaviors described herein. Such technical improvements include being more responsive to a user (e.g., as the user dynamically varies the speed of the touch-and-drag input), providing a greater degree of control (e.g., over the speed at which the word is pronounced) to the user, providing more natural sounding auditory feedback to the user (e.g., at high pronunciation speeds, at low pronunciation speeds, or both), providing more natural looking visual feedback (e.g., in the form of animated mouth movements presented on a display screen) to the user, enabling the user to quickly and conveniently experiment with several different pronunciation speeds for a word (e.g., by repeatedly pronouncing the word in response to repeated touch-and-drag inputs at different speeds), or any suitable combination thereof.

To provide these technical features and benefits, the variable-speed phonetic pronunciation machine is configured to present a GUI on a touch-sensitive display screen of the machine, where the GUI depicts a slider control that is aligned with a word. The word includes (e.g., at least) a sequentially first alphabetic letter and a sequentially second alphabetic letter. As depicted in the GUI, a first zone of the slider control corresponds to the sequentially first alphabetic letter of the word, and a second zone of the slider control corresponds to the sequentially second alphabetic letter of the word.

The machine is further configured to detect, via the touch-sensitive display screen, a touch-and-drag input (e.g., a swipe gesture) that begins within the first zone of the slider control and enters the second zone of the slider control. In response to the touch-and-drag input beginning within the first zone of the slider control, the machine presents or otherwise causes presentation of a first phoneme that corresponds to the sequentially first alphabetic letter of the word, and the presenting of the first phoneme may include audio playback of the first phoneme. In response to the touch-and-drag input entering the second zone of the slider control, the machine presents or otherwise causes presentation of a second phoneme that corresponds to the sequentially second alphabetic letter of the word, and the presenting of the second phoneme may include audio playback of the second phoneme.

FIGS. 1-5 are face views of a machine 100 (e.g., a device, such as a mobile device) with a display screen 101 on which a GUI 110 suitable for variable-speed phonetic pronunciation is presented, according to some example embodiments. As shown in FIG. 1, the display screen 101 is touch-sensitive and configured to accept one or more touch inputs from one or more fingers of a user, and as an example, a finger 140 is illustrated as touching the display screen 101 of the machine 100.

The GUI 110 is presented on the display screen 101 and depicts (e.g., among other things) a word 120 (e.g., "CAT,"

as depicted, or alternatively "DOG," "MOM," "DAD," "BABY," "APPLE," "SCHOOL," or "BACKPACK") and a slider control 130 (e.g., a slider bar). The slider control 130 may be visually aligned with the word 120. For example, both the slider control 130 and the word 120 may follow the same straight line or follow two parallel lines. As another example, both the slider control 130 and the word 120 may follow the same curved line or follow two curved lines that are a constant distance apart.

As shown in FIG. 1, the slider control 130 may include a slide element 131, such as a position indicator bar or other marker (e.g., a cursor) that indicates progress in pronouncing the word 120 or its phonemes. As further shown in FIG. 1, the word 120 includes one or more alphabetic letters and may therefore include (e.g., among other text characters) a sequentially first alphabetic letter 121 (e.g., "C") and a sequentially second alphabetic letter 122 (e.g., "A"). The word 120 may further include a third alphabetic letter 123 (e.g., "T"). For example, the word 120 may be a consonant-vowel-consonant (CVC) word, such as "cat" or "dog," and accordingly include the sequentially first alphabetic letter 121, the sequentially second alphabetic letter 122, and the sequentially third alphabetic letter 123.

Different zones of the slider control 130 correspond to different alphabetic letters of the word 120, and each zone of the slider control 130 may be visually aligned with its corresponding alphabetic letter of the word 120. Hence, with reference to FIG. 1, a first zone of the slider control 130 corresponds to the sequentially first alphabetic letter 121 (e.g., "C") and may be visually aligned with the sequentially first alphabetic letter 121, and a second zone of the slider control 130 corresponds to the sequentially second alphabetic letter 122 (e.g., "A") and may be visually aligned with the sequentially second alphabetic letter 122. Similarly, a third zone of the slider control 130 may correspond to the sequentially third alphabetic letter 123 (e.g., "T") and may be visually aligned with the sequentially third alphabetic letter 123.

In addition, the GUI 110 may include an avatar 150 or other character (e.g., a cartoon character), and the avatar 150 may be animated or otherwise rendered (e.g., in two dimensions or in three dimensions) with one or more moving parts. For example, the avatar 150 may have an animated mouth 151 that changes its shape based on (e.g., in accordance with, in response to, or both) the phoneme currently being pronounced by the machine 100.

As shown in FIG. 1, the finger 140 is performing a touch-and-drag input (e.g., a swipe gesture) on the display screen 101. To start the touch-and-drag input, the finger 140 is touching the display screen 101 at a location (e.g., a first location) that is within the first zone of the slider control 130, and the display screen 101 detects that the finger 140 is touching the display screen 101 at that location. Accordingly, the touch-and-drag input is beginning (e.g., touching down) within the first zone of the slider control 130. As noted above, the first zone of the slider control 130 corresponds to the sequentially first alphabetic letter 121 (e.g., "C"). In response to detection of the finger 140 touching the illustrated location within the GUI 110, the GUI 110 presents the slide element 131 at the same location. As noted above, the slide element 131 may indicate an extent of progress attained in pronouncing the phonemes of the word 120 (e.g., no progress, as illustrated in FIG. 1). The animated mouth 151 of the avatar 150 may accordingly be shown in a neutral shape (e.g., a neutral mouth shape, such as a smile or an expressionless shape with closed lips).

In response to the touch-and-drag input beginning within the first zone of the slider control 130, the machine 100 presents a first phoneme that corresponds to the sequentially first alphabetic letter 121 (e.g., "C") that corresponds to the first zone of the slider control 130. This presenting of the first phoneme may include audio playback of the first phoneme (e.g., audio playback of a sound file that records an actor pronouncing the first phoneme). According to some example embodiments, the presenting of the first phoneme includes displaying the animated mouth 151 in a first shape (e.g., a first mouth shape) that corresponds to the first phoneme, and the displaying up to the animated mouth 151 in the first shape may be maintained during the audio playback of the first phoneme. In certain example embodiments, the presenting of the first phoneme includes or is accompanied by changing the color of the sequentially first alphabetic letter 121 (e.g., from a first color to a second color during the audio playback of the first phoneme and then changing its color back again after the audio playback of the first phoneme).

Figure 2:
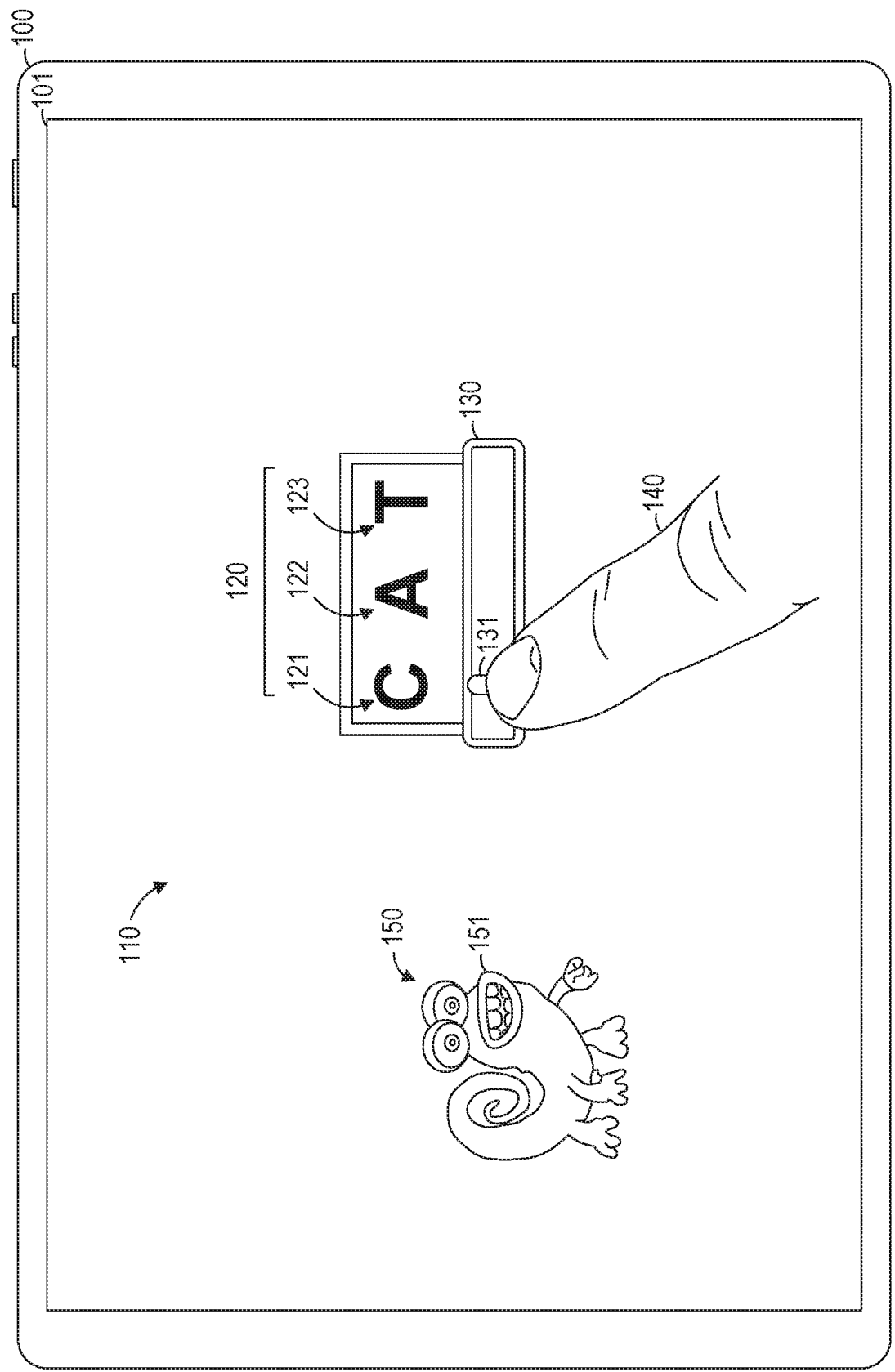

As shown in FIG. 2, the finger 140 continues to perform the touch-and-drag input on the display screen 101, and the touch-and-drag input is still within the first zone of the slider control 130. That is, the finger 140 is touching the display screen 101 at a location (e.g., a second location) that is within the first zone of the slider control 130, and the display screen 101 detects that the finger 140 is touching the display screen 101 at that location. Accordingly, the touch-and-drag input continues but remains within the first zone of the slider control 130. In response to detection of the finger 140 touching the illustrated location within the GUI 110, the GUI 110 presents the slide element 131 at the same location. As noted above, the slide element 131 may indicate an extent of progress attained in pronouncing the phonemes of the word 120 (e.g., progress up to pronunciation of the phoneme that corresponds to the first sequential alphabetic letter, as illustrated in FIG. 2).

In response to the touch-and-drag input remaining within the first zone of the slider control 130, in situations where the first phoneme is a vowel phoneme, the machine 100 may sustain (e.g., prolong) the audio playback of the first phoneme. This may be performed by repeatedly looping at least a portion of the vowel phoneme, and such repeated looping may be performed for as long as the touch-and-drag input remains within the first zone of the slider control 130. On the other hand, in response to the touch-and-drag input remaining within the first zone of the slider control 130, in situations where the first phoneme is a consonant phoneme, the machine 100 may stop (e.g., cease) the audio playback of the consonant phoneme after exactly one iteration. For example, the machine 100 may start to playback silence after completion of a single playback of the consonant phoneme and thereafter continue to playback silence as long as the touch-and-drag input remains within the first zone of the slider control 130. As another example, the machine 100 may limit itself to playing back only background sounds, background music, or any suitable combination thereof, without playing back any foreground audio, such as recorded or synthesized speech, as long as the touch-and-drag input remains within the first zone of the slider control 130.

Figure 3:
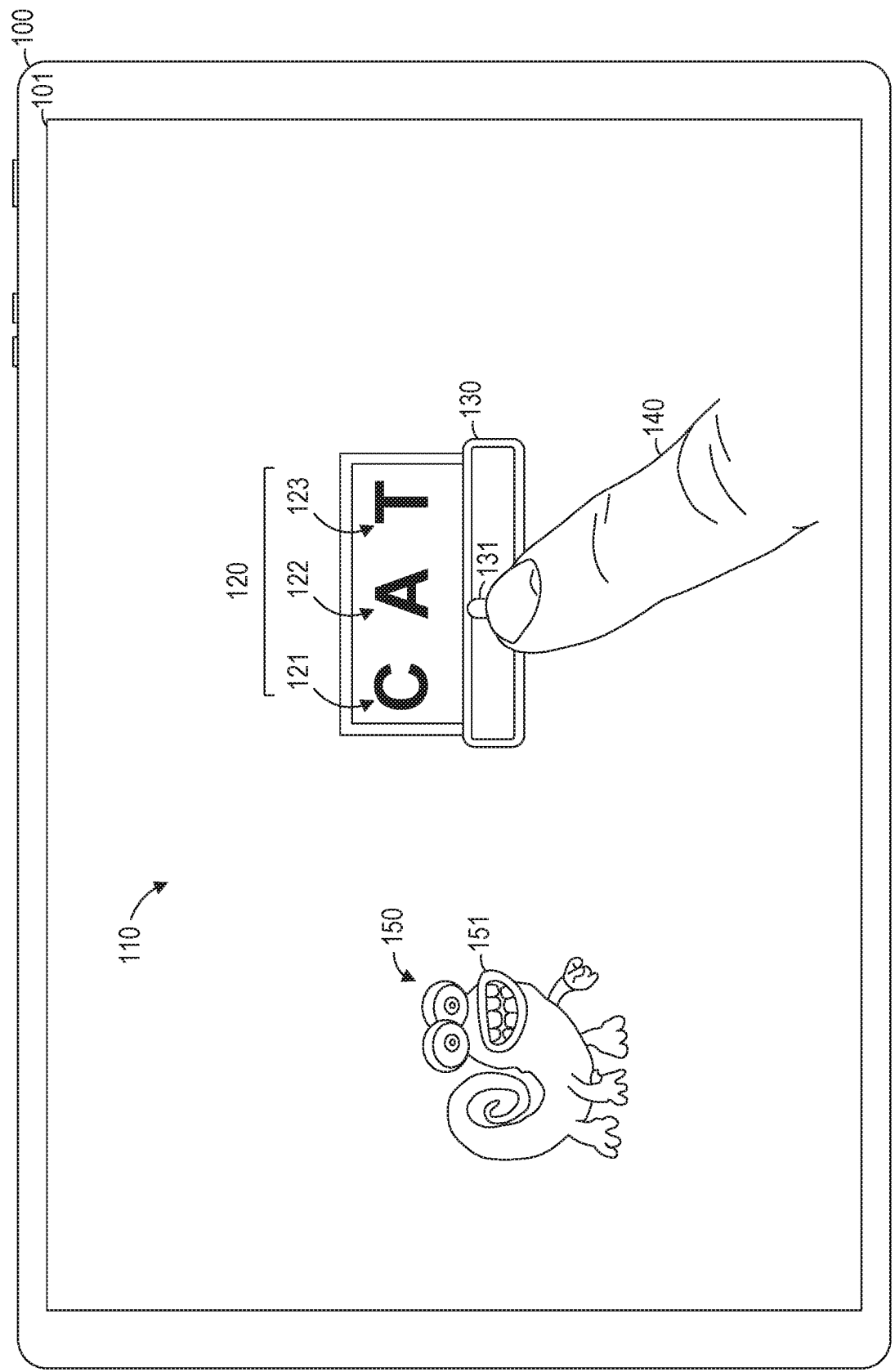

As shown in FIG. 3, the finger 140 continues to perform the touch-and-drag input on the display screen 101, and the touch-and-drag input has entered the second zone of the slider control 130. That is, the finger 140 is touching the display screen 101 at a location (e.g., a third location) that is within the second zone of the slider control 130, and the display screen 101 detects that the finger 140 is touching the display screen 101 at that location. Accordingly, the touch-and-drag input continues and is now within the second zone of the slider control 130. In response to detection of the finger 140 touching the illustrated location within the GUI 110, the GUI 110 presents the slide element 131 at the same location. As noted above, the slide element 131 may indicate an extent of progress attained in pronouncing the phonemes of the word 120 (e.g., progress up to pronunciation of the phoneme that corresponds to the second sequential alphabetic letter, as illustrated in FIG. 3).

In response to the touch-and-drag input entering the second zone of the slider control 130, the machine 100 presents a second phoneme that corresponds to the sequentially second alphabetic letter 122. (e.g., "A") that corresponds to the second zone of the slider control 130. This presenting of the second phoneme may include audio playback of the second phoneme (e.g., audio playback of a sound file that records an actor pronouncing the second phoneme). According to some example embodiments, the presenting of the second phoneme includes displaying the animated mouth 151 in a second shape (e.g., a second mouth shape) that corresponds to the second phoneme, and the displaying of the animated mouth 151 in the second shape may be maintained during the audio playback of the second phoneme. In certain example embodiments, the presenting of the second phoneme includes or is accompanied by changing the color of the sequentially second alphabetic letter 122 (e.g., from a first color to a second color during the audio playback of the second phoneme, and then changing its color back again after the audio playback of the second phoneme).

Furthermore, in response to the touch-and-drag input remaining within the second zone of the slider control 130, in situations where the second phoneme is a vowel phoneme, the machine 100 may sustain (e.g., prolong) the audio playback of the second phoneme. This may be performed by repeatedly looping at least a portion of the vowel phoneme, and such repeated looping may be performed for as long as the touch-and-drag input remains within the second zone of the slider control 130. On the other hand, in response to the touch-and-drag input remaining within the second zone of the slider control 130, in situations where the second phoneme is a consonant phoneme, the machine 100 may stop (e.g., cease) the audio playback of the consonant phoneme after exactly one iteration. For example, the machine 100 may start to playback silence after completion of a single playback of the consonant phoneme and thereafter continue to playback silence as long as the touch-and-drag input remains within the second zone of the slider control 130. As another example, the machine 100 may limit itself to playing back only background sounds, background music, or any suitable combination thereof, without playing back any foreground audio, such as recorded or synthesized speech, as long as the touch-and-drag input remains within the second zone of the slider control 130.

Figure 4:
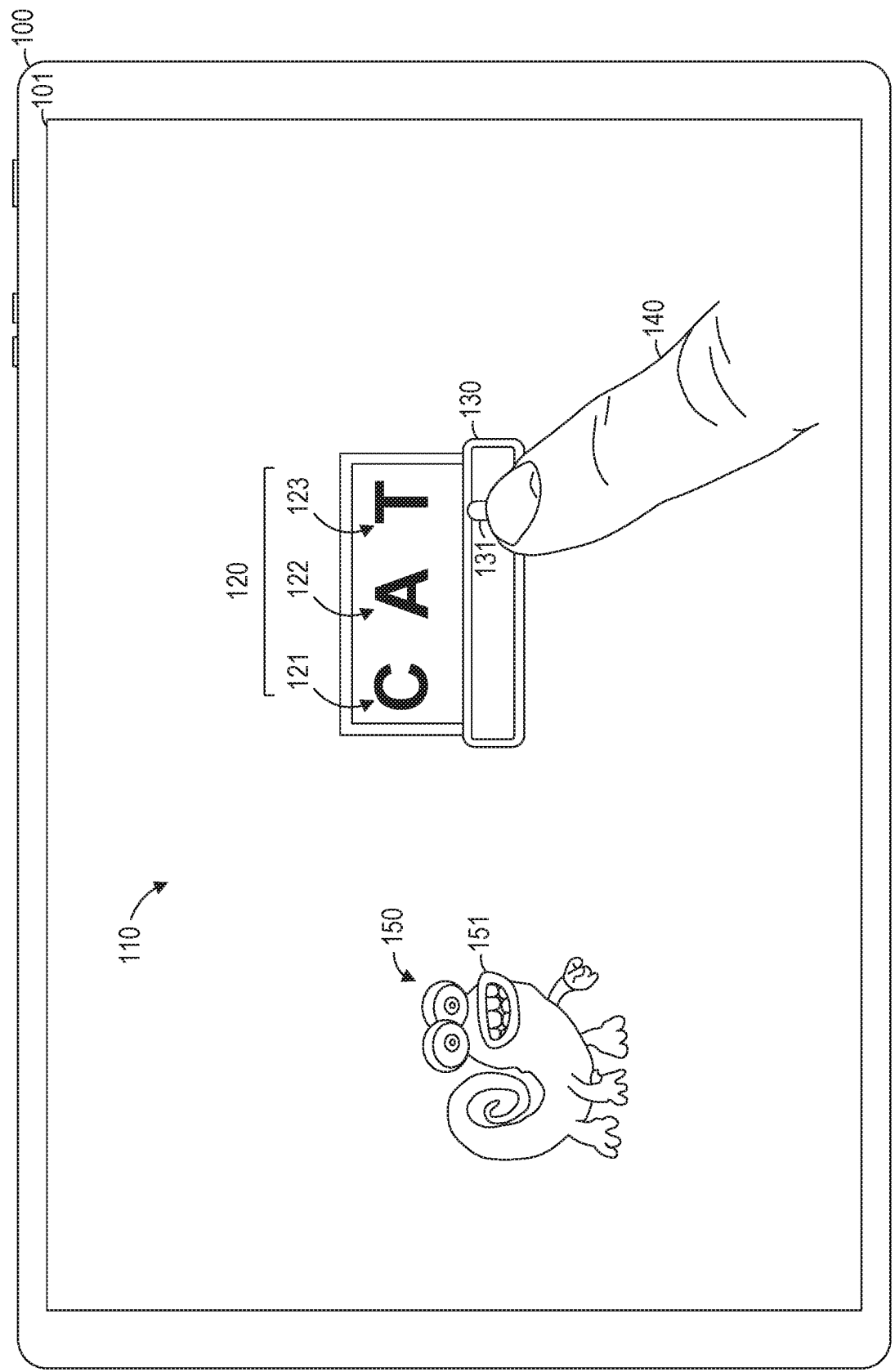

As shown in FIG. 4, the finger 140 continues to perform the touch-and-drag input on the display screen 101, and the touch-and-drag input has entered the third zone of the slider control 130. That is, the finger 140 is touching the display screen 101 at a location (e.g., a fourth location) that is within the third zone of the slider control 130, and the display screen 101 detects that the finger 140 is touching the display screen 101 at that location. Accordingly, the touch-and-drag input continues and is now within the third zone of the slider control 130. In response to detection of the finger 140 touching the illustrated location within the GUI 110, the GUI 110 presents the slide element 131 at the same location. As noted above, the slide element 131 may indicate an extent of progress attained in pronouncing the phonemes of the word 120 (e.g., progress up to pronunciation of the phoneme that corresponds to the third sequential alphabetic letter, as illustrated in FIG. 4).

In response to the touch-and-drag input entering the third zone of the slider control 130, the machine 100 presents a third phoneme that corresponds to the sequentially third alphabetic letter 123 (e.g., "T") that corresponds to the third zone of the slider control 130. This presenting of the third phoneme may include audio playback of the third phoneme (e.g., audio playback of a sound file that records an actor pronouncing the third phoneme). According to some example embodiments, the presenting of the third phoneme includes displaying the animated mouth 151 in a third shape (e.g., a second third shape) that corresponds to the third phoneme, and the displaying up to the animated mouth 151 in the third shape may be maintained during the audio playback of the second phoneme. In certain example embodiments, the presenting of the third phoneme includes or is accompanied by changing the color of the sequentially third alphabetic letter 123 (e.g., from a first color to a second color during the audio playback of the third phoneme, and then changing its color back again after the audio playback of the third phoneme).

Furthermore, in response to the touch-and-drag input remaining within the third zone of the slider control 130, in situations where the third phoneme is a vowel phoneme, the machine 100 may sustain (e.g., prolong) the audio playback of the third phoneme. This may be performed by repeatedly looping at least a portion of the vowel phoneme, and such repeated looping may be performed for as long as the touch-and-drag input remains within the third zone of the slider control 130. On the other hand, in response to the touch-and-drag input remaining within the third zone of the slider control 130, in situations where the third phoneme is a consonant phoneme, the machine 100 may stop (e.g., cease) the audio playback of the consonant phoneme after exactly one iteration. For example, the machine 100 may start to playback silence after completion of a single playback of the consonant phoneme and thereafter continue to playback silence as long as the touch-and-drag input remains within the third zone of the slider control 130. As another example, the machine 100 may limit itself to playing back only background sounds, background music, or any suitable combination thereof, without playing back any foreground audio, such as recorded or synthesized speech, as long as the touch-and-drag input remains within the third zone of the slider control 130.

Figure 5:
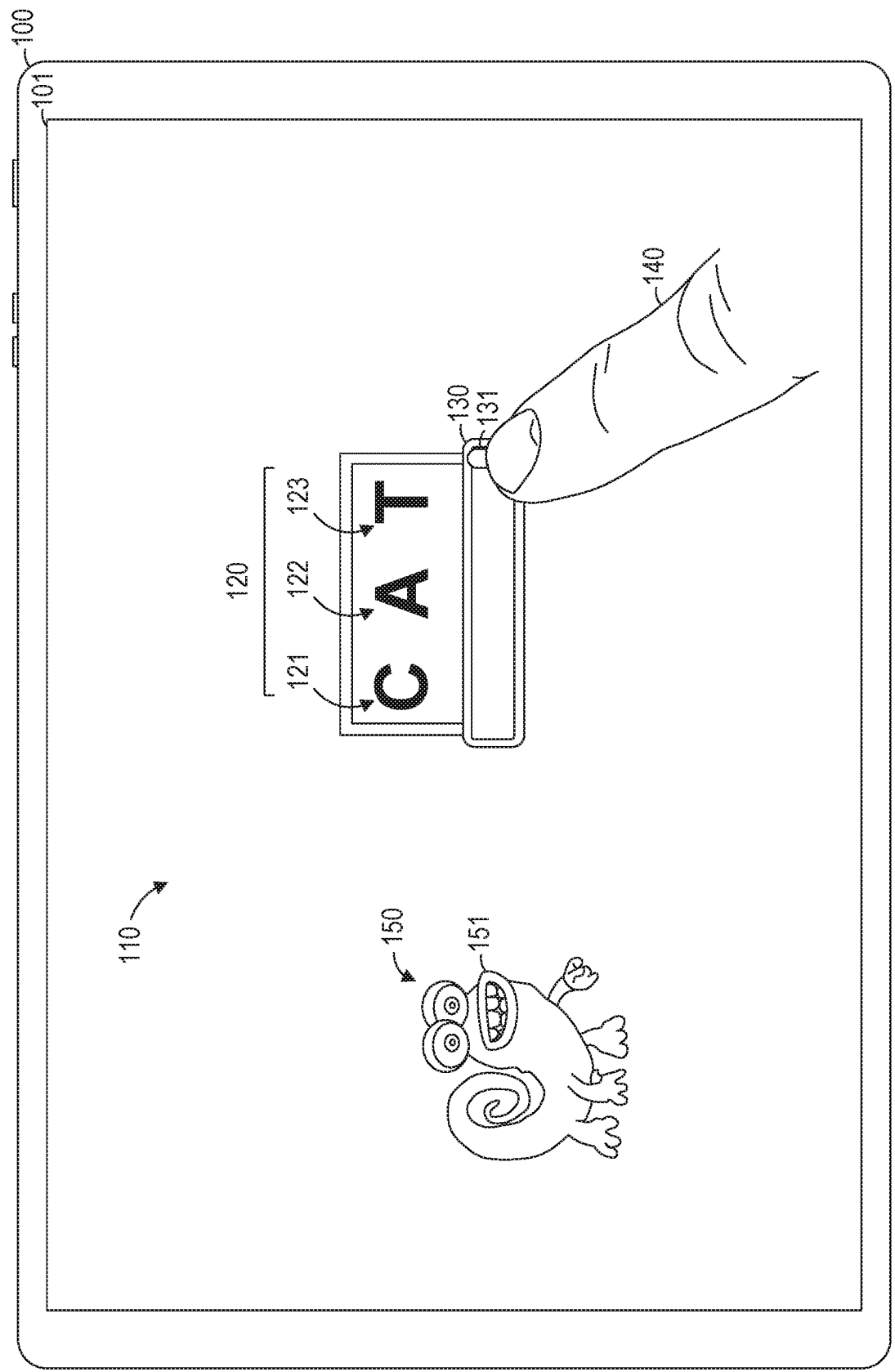

As shown in FIG. 5, the finger 140 is finishing the touch-and-drag input on the display screen 101 by just lifting off the display screen 101 at a location (e.g., a fifth location) that is within the third zone of the slider control 130, and the display screen 101 detects that the finger 140 has moved to this location on the display screen 101 and then stopped contacting the display screen 101. Accordingly, the touch-and-drag input has ended within the third zone of the slider control 130. As noted above, the third zone of the slider control 130 corresponds to the sequentially third alphabetic letter 123 (e.g., "T"). In response to detection of the finger 140 lifted off the display screen 101 at the illustrated location within the GUI 110, the GUI 110 presents the slide element 131 at the same location. As noted above, the slide element 131 may indicate an extent of progress attained in pronouncing the phonemes of the word 120 (e.g., progress to completion, as illustrated in FIG. 5). The animated mouth 151 of the avatar 150 may accordingly revert to a neutral shape (e.g., a neutral mouth shape, such as a smile or an expressionless shape with closed lips).

Figure 6:
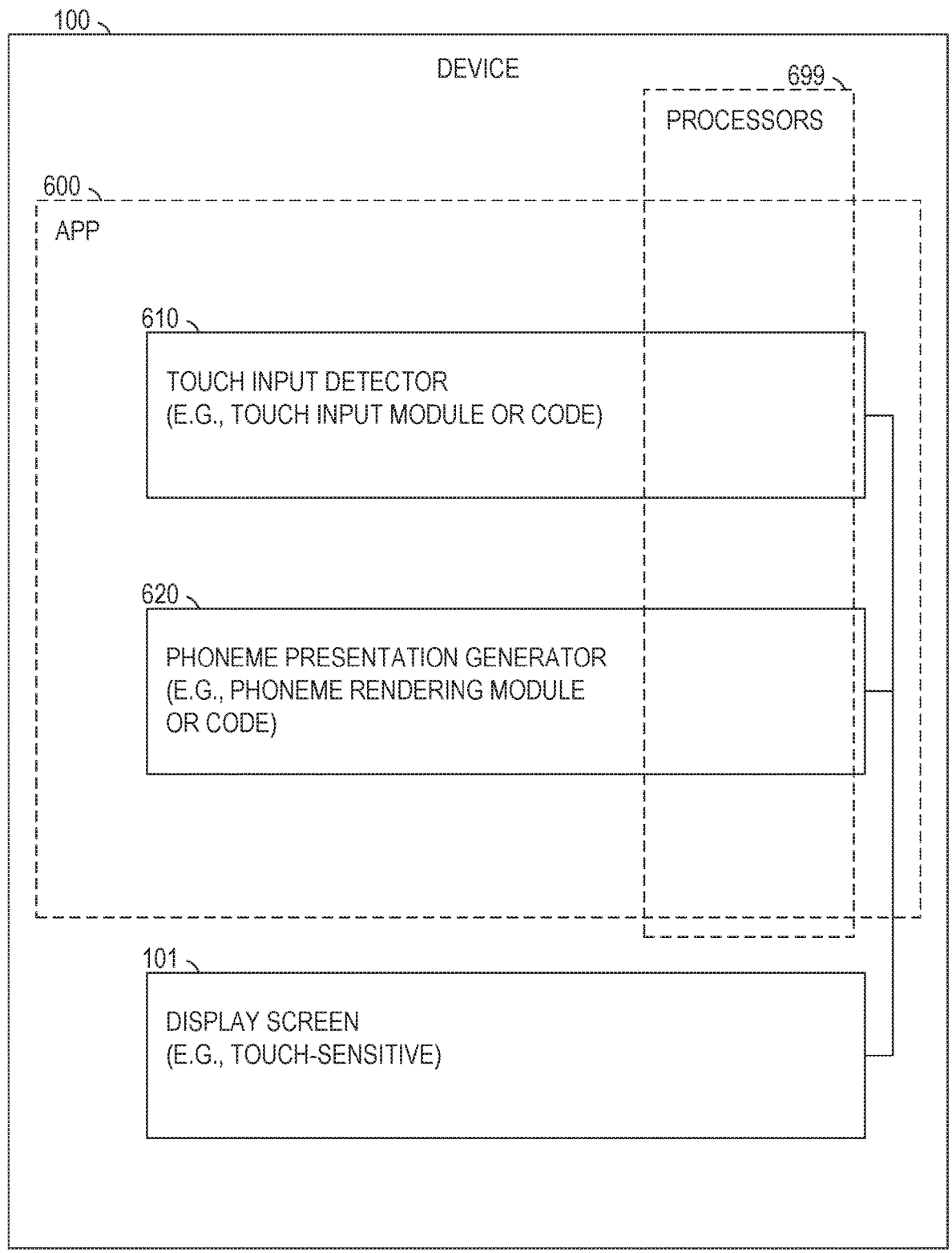
FIG. 6 is a block diagram illustrating components of a machine suitable for variable-speed phonetic pronunciation, according to some example embodiments.

FIG. 6 is a block diagram illustrating components of the machine 100, as configured for variable-speed phonetic pronunciation, according to some example embodiments. The machine 100 is shown as including a touch input detector 610, a phoneme presentation generator 620, and the display screen 101, all configured to communicate with each other (e.g., via a bus, shared memory, or a switch). The touch input detector 610 may be or include a touch input module or similarly suitable software code for detecting one or more touch inputs (e.g., a touch-and-drag input) occurring on the display screen 101. The phoneme presentation generator 620 may be or include a phoneme rendering module or similarly suitable software code for rendering or otherwise generating a presentation of one or more phonemes (e.g., via the machine 100 or any portion thereof, including via the GUI 110, via an audio playback subsystem of the machine 110, or both).

As shown in FIG. 6, the touch input detector 610, the phoneme presentation generator 620, or both, may form all or part of an app 600 (e.g., a mobile app) that is stored (e.g., installed) on the machine 100 (e.g., responsive to or otherwise as a result of data being received from one or more server machines via a network). Furthermore, one or more processors 699 (e.g., hardware processors, digital processors, or any suitable combination thereof) may be included (e.g., temporarily or permanently) in the app 600, the touch input detector 610, the phoneme presentation generator 620, or any suitable combination thereof.

Any one or more of the components (e.g., modules) described herein may be implemented using hardware alone (e.g., one or more of the processors 699) or a combination of hardware and software. For example, any component described herein may physically include an arrangement of one or more of the processors 699 (e.g., a subset of or among the processors 699) configured to perform the operations described herein for that component. As another example, any component described herein may include software, hardware, or both, that configure an arrangement of one or more of the processors 699 to perform the operations described herein for that component. Accordingly, different components described herein may include and configure different arrangements of the processors 699 at different points in time or a single arrangement of the processors 699 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

The machine 110 may be, include, or otherwise be implemented in a special-purpose (e.g., specialized or otherwise non-conventional and non-generic) computer that has been modified to perform one or more of the functions described herein (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 11, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Accordingly, the machine 100 may be implemented in the special-purpose (e.g., specialized) computer system, in whole or in part, as described below with respect to FIG. 11. According to various example embodiments, the machine 100 may be or include a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry).

Figure 7:
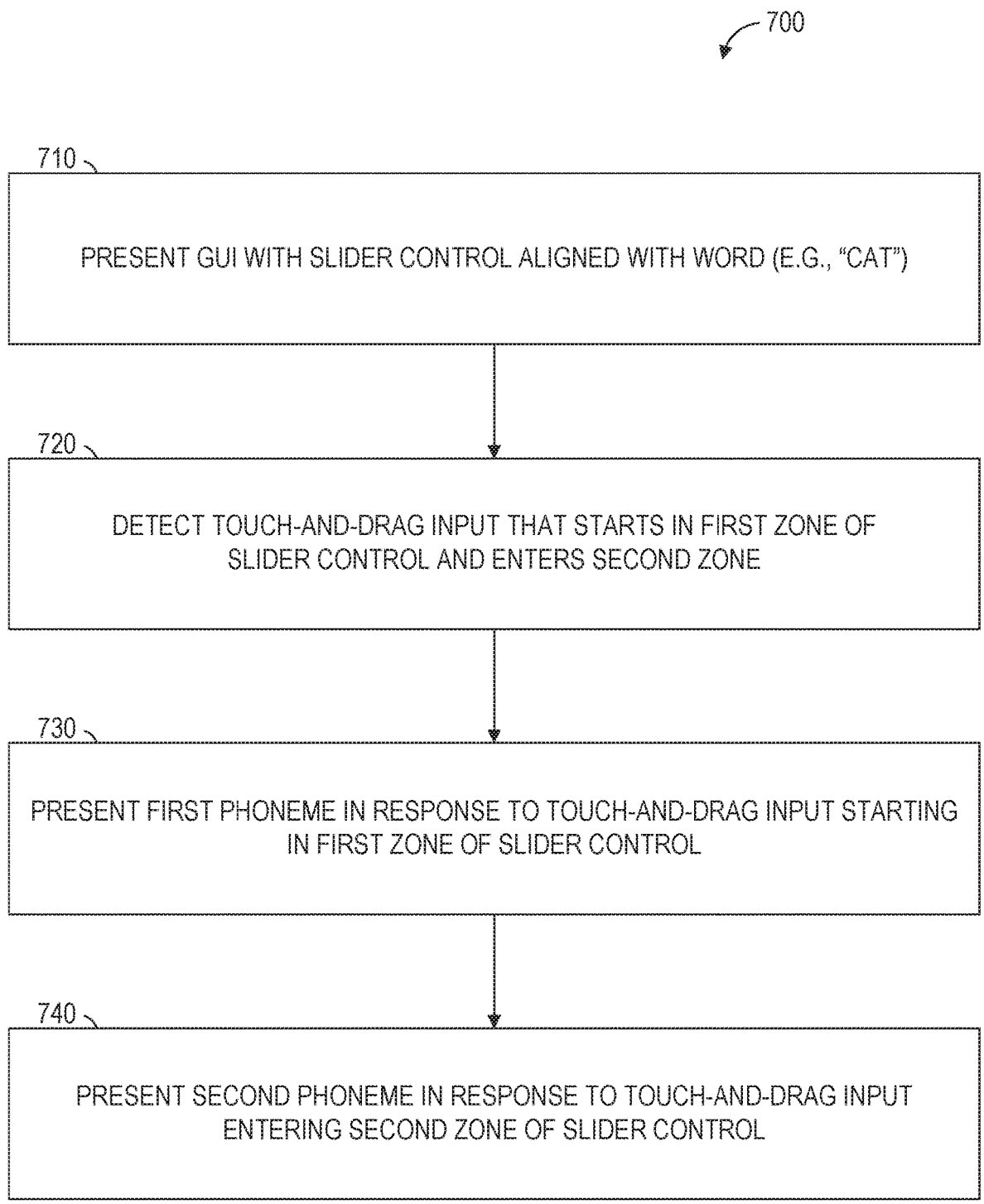
FIGS. 7-10 are flowcharts illustrating operations of a machine in performing a method of variable-speed phonetic pronunciation, according to some example embodiments.

FIGS. 7-10 are flowcharts illustrating operations of the machine 100 in performing a method 700 of variable-speed phonetic pronunciation, according to some example embodiments. Operations in the method 700 may be performed by the machine 100, using components (e.g., modules) described above with respect to FIG. 6, using one or more processors (e.g., microprocessors or other hardware processors), or using any suitable combination thereof. As shown in FIG. 7, the method 700 includes operations 710, 720, 730, and 740.

In operation 710, the app 600 presents the GUI 110 on the display screen 101 (e.g., a touchscreen or other touch-sensitive display screen) or otherwise causes the GUI 110 to be presented on the display screen 101. As noted above, the GUI 110 depicts the slider control 130, and the slider control 130 is aligned with the word 120, which is also depicted by the GUI 110. As further noted above, the word 120 includes (e.g., at least) the sequentially first alphabetic letter 121 and the sequentially second alphabetic letter 122. Furthermore, a first zone of the slider control 130 (e.g., a region of the slider control 130 near the sequentially first alphabetic letter 121) corresponds to the sequentially first alphabetic letter 121, and a second zone of the slider control (e.g., a region of the slider control 130 near the sequentially second alphabetic letter 122) corresponds to the sequentially second alphabetic letter 122. In some example embodiments, operation 710 is performed by the phoneme presentation generator 620 of the app 600. The visual effect of operation 710 may appear as illustrated in FIG. 1.

In operation 720, the touch input detector 610 detects (e.g., via, using, in conjunction with, or otherwise based on the display screen 101) a touch-and-drag input that begins within the first zone of the slider control 130 and enters the second zone of the slider control 130. The visual effect of operation 720 may appear as illustrated in FIGS. 1-3.

In operation 730, the phoneme presentation generator 620 responds to the touch-and-drag input beginning within the first zone of the slider control 130 by presenting a first phoneme that corresponds to the sequentially first alphabetic letter 121 of the word 120. As noted above with respect to FIG. 1 and FIG. 2, the presenting of the first phoneme may include performing or otherwise causing audio playback of the first phoneme (e.g., among other things).

In operation 740, the phoneme presentation generator 620 responds to the touch-and-drag input entering the second zone of the slider control 130 by presenting a second phoneme that corresponds to the sequentially second alphabetic letter 122 of the word 120. As noted above with respect to FIG. 3, the presenting of the second phoneme may include performing or otherwise causing audio playback of the second phoneme (e.g., among other things).

Figure 8:
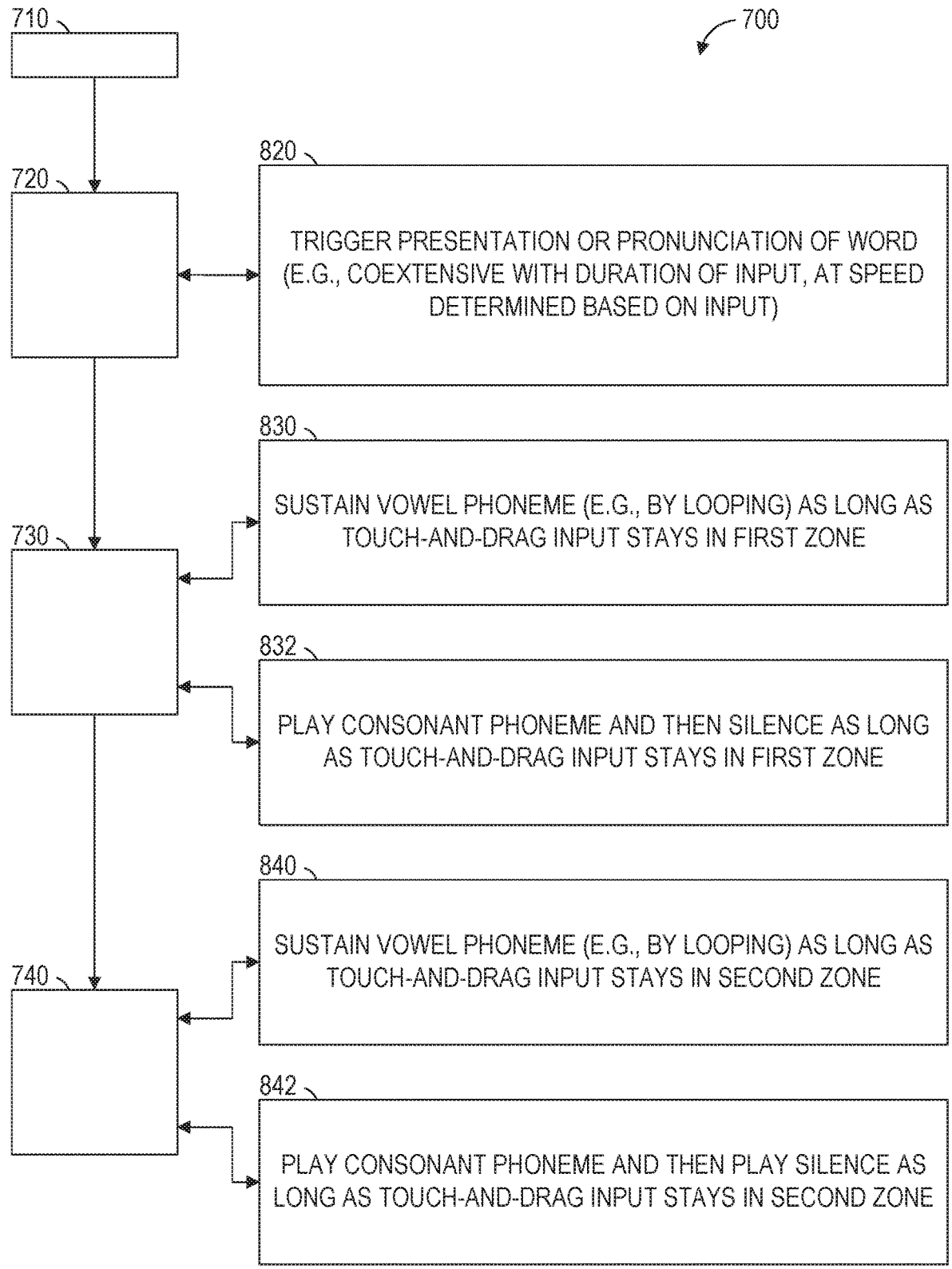

As shown in FIG. 8, in addition to any one or more of the operations previously described, the method 700 may include one or more of operations 820, 830, 832, 840, and 842. Operation 820 may be performed as part (e.g., a precursor task, a subroutine, or a portion) of operation 720, in which the touch input detector 610 detects that the touch-and-drag input starts in the first zone of the slider control 130 and enters the second zone of the slider control 130. In operation 820, that touch input detector 610 triggers a presenting of a pronunciation of the word 120 in response to the detecting of the touch-and-drag input.

For example, in example embodiments that include operation 820, the touch-and-drag input may have a certain duration, and the touch input detector 610 may trigger presentation of a pronunciation whose duration is coextensive with the duration of the touch-and-drag input (e.g., however long that duration turns out to be). In this situation, the presenting of the pronunciation of the word 120 may include performing downstream operations 730 and 740, in which the first and second phonemes are presented, within the duration of the touch-and-drag input.

As another example, in example embodiments that include operation 820, the touch-and-drag input may have a certain speed (e.g., a movement speed on the display screen 101), and the touch input detector 610 may trigger presentation of a pronunciation at a speed (e.g., a speech speed at which successive phonemes of the word 120 are played back) that is determined based on the speed (e.g., movement speed) of the touch-and-drag input. In this situation, the presenting of the pronunciation of the word 128 may include performing downstream operations 730 and 740, in which the first and second phonemes are presented, at the speech speed determined based on the movement speed of the touch-and-drag input.

As part of operation 730, either operation 830 or operation 832 may be performed, depending on whether the first phoneme that corresponds to the sequentially first alphabetic letter 121 is a consonant phoneme or a vowel phoneme. In operation 830, the first phoneme is a vowel phoneme, and the phoneme presentation generator 620, as part of presenting the first phoneme, sustains (e.g., prolongs) the vowel phoneme for an indefinite duration as long as the touch-and-drag input stays in the first zone of the slider control 130 (e.g., until the touch-and-drag input exits the first zone). As noted above, this may be performed by looping at least a portion of the vowel phoneme as long as the touch-and-drag input remains in the first zone. Alternatively, in operation 832, the first phoneme is a consonant phoneme, and the phoneme presentation generator 620, as part of presenting the first phoneme, plays the consonant phoneme followed by silence for an indefinite duration as long as the touch-and-drag input stays in the first zone of the slider control 130 (e.g., until the touch-and-drag input exits the first zone). As noted above, this may be performed by playing back the consonant phoneme exactly once and then playing back silence or playing back only background audio (e.g., background sounds, background music, or both) without any foreground audio (e.g., without any recorded speech, synthesized speech, or both).

As part of operation 740, either operation 840 or operation 842 may be performed, depending on whether the second phoneme that corresponds to the sequentially second alphabetic letter 122 is a consonant phoneme or a vowel phoneme. In operation 840, the second phoneme is a vowel phoneme, and the phoneme presentation generator 620, as part of presenting the second phoneme, sustains (e.g., prolongs) the vowel phoneme for an indefinite duration as long as the touch-and-drag input stays in the second zone of the slider control 130 (e.g., until the touch-and-drag input exits the second zone). As noted above, this may be performed by looping at least a portion of the vowel phoneme as long as the touch-and-drag input remains in the second zone. Alternatively, in operation 842, the second phoneme is a consonant phoneme, and the phoneme presentation generator 620, as part of presenting the second phoneme, plays the consonant phoneme followed by silence for an indefinite duration as long as the touch-and-drag input stays in the second zone of the slider control 130 (e.g., until the touch-and-drag input exits the second zone). As noted above, this may be performed by playing back the consonant phoneme exactly once and then playing back silence or playing back only background audio (e.g., background sounds, background music, or both) without any foreground audio (e.g., without any recorded speech, synthesized speech, or both).

Figure 9:
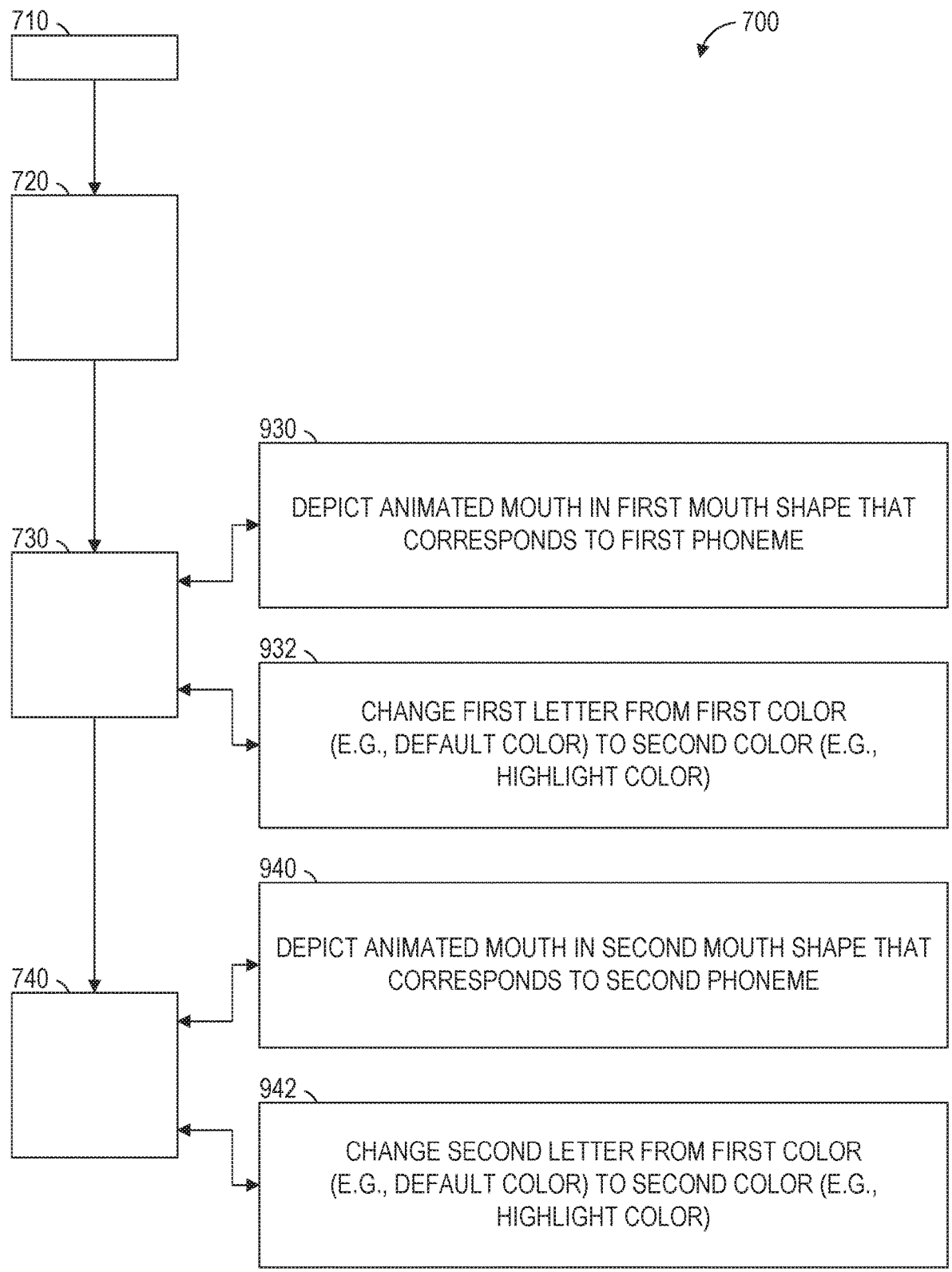

As shown in FIG. 9, in addition to any one or more of the operations previously described, the method 700 may include one or more of operations 930, 932, 940, and 942.

One or both of operation 930 and operation 932 may be performed as part of operation 730, according to various example embodiments. In operation 930, the phoneme presentation generator 620, as part of presenting the first phoneme, depicts or causes the GUI 110 to depict the animated mouth 151 of the avatar 150 in a first shape (e.g., a first mouth shape) that corresponds to the first phoneme. This may be performed by accessing and rendering a two-dimensional image of the first shape or a three-dimensional model of the first shape or otherwise causing such a two-dimensional image or a three-dimensional model to be accessed and rendered by the GUI 110.

In operation 932, the phoneme presentation generator 620, as part of presenting the first phoneme, changes the color of the sequentially first alphabetic letter 121 by changing the color from a first color (e.g., a default color, such as blue) to a second color (e.g., a highlight color, such as yellow).

One or both of operation 940 and operation 942 may be performed as part of operation 740, according to various example embodiments. In operation 940, the phoneme presentation generator 620, as part of presenting the second phoneme, depicts or causes the GUI 110 to depict the animated mouth 151 of the avatar 150 in a second shape (e.g., a second mouth shape) that corresponds to the second phoneme. This may be performed by accessing and rendering a two-dimensional image of the second shape or a three-dimensional model of the second shape or otherwise causing such a two-dimensional image or a three-dimensional model to be accessed and rendered by the GUI 110.

In operation 942, the phoneme presentation generator 620, as part of presenting the second phoneme, changes the color of the sequentially second alphabetic letter 122 by changing the color from a first color (e.g., a default color, such as blue) to a second color (e.g., a highlight color, such as yellow).

Figure 10:
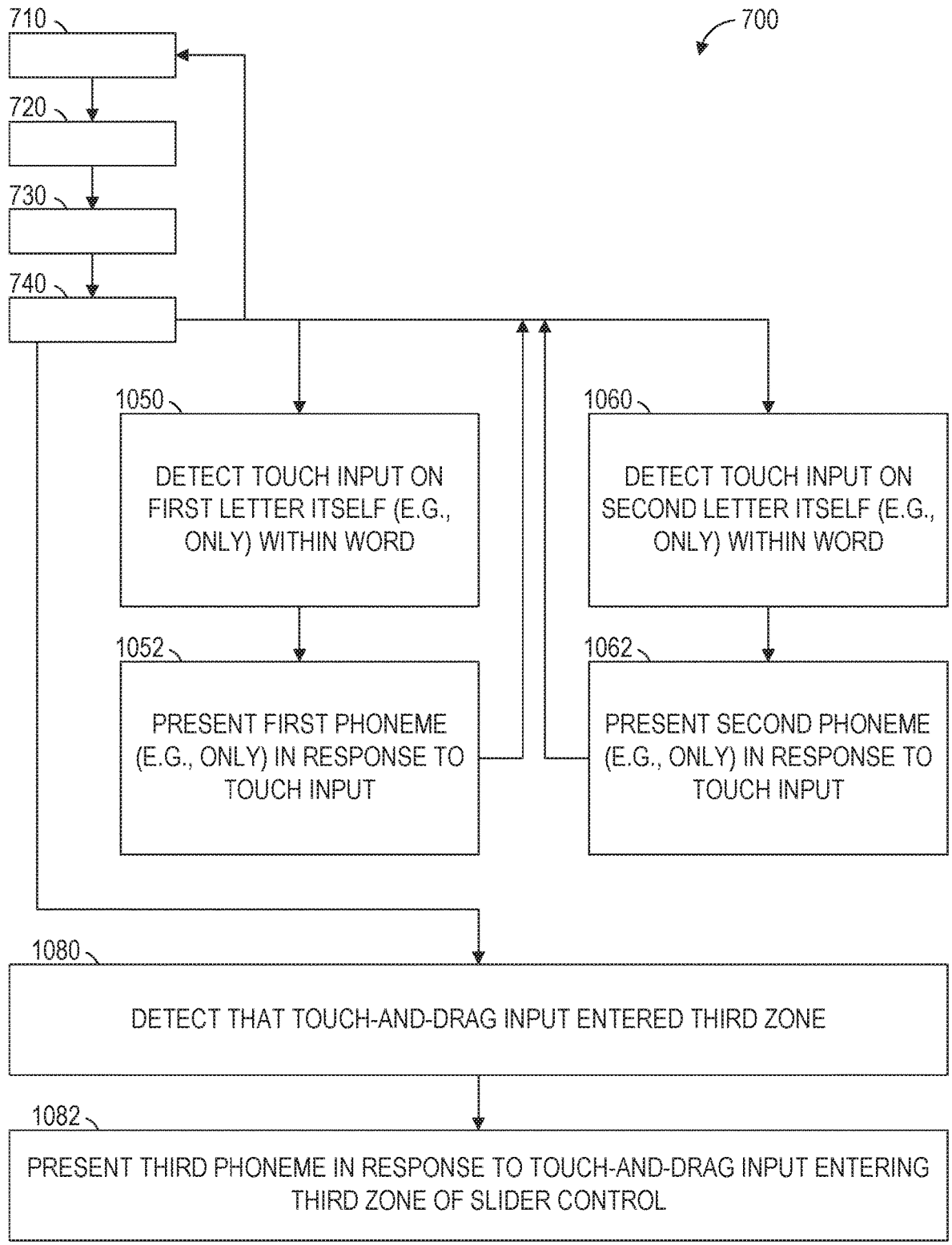

As shown in FIG. 10, in addition to any one or more of the operations previously described, the method 700 may include one or more of operations 1050, 1052, 1060, 1062, 1080, and 1082.

According to certain example embodiments, individual touch inputs on individual alphabetic letters 121, 122, and 123 of the word 120 are detected by the touch input detector 610 (e.g., via the display screen 101), and each individual touch input on an individual alphabetic letter (e.g., on the first sequential alphabetic letter 121) triggers presentation of the corresponding phoneme for that alphabetic letter (e.g., audio playback of the first phoneme, with or without the animated mouth 151 changing shape to a corresponding mouth shape, and with or without changing the color of the first sequential alphabetic letter 121).

In operation 1050, the touch input detector 610 detects (e.g., via, using, in conjunction with, or otherwise based on the display screen 101) a touch input (e.g., a single tap or a double tap) at a location of the display screen 101 where the GUI 110 is presenting (e.g., displaying) the sequentially first alphabetic letter 121 (e.g., "C") within the word 120. In response, in operation 1052, the phoneme presentation generator 620 presents the first phoneme that corresponds to the sequentially first alphabetic letter 121 of the word 120. Such a presentation may be performed in a manner similar to that described above for the first phoneme. For example, any one or more of operations 830, 832, 930, and 932 may be performed, as appropriate, in accordance with the above discussions of those operations.

In operation 1060, the touch input detector 610 detects (e.g., via, using, in conjunction with, or otherwise based on the display screen 101) a touch input (e.g., a single tap or a double tap) at a location of the display screen 101 where the GUI 110 is presenting (e.g., displaying) the sequentially second alphabetic letter 122 (e.g., "A") within the word 120. In response, in operation 1062, the phoneme presentation generator 620 presents the second phoneme that corresponds to the sequentially second alphabetic letter 122 of the word 120. Such a presentation may be performed in a manner similar to that described above for the second phoneme. For example, any one or more of operations 840, 842, 940, and 942 may be performed, as appropriate, in accordance with the above discussions of those operations.

In situations where the word 120 (e.g., "CAT") has a sequentially third alphabetic letter (e.g., "T"), one or both of operations 1080 and 1082 may be performed in a manner similar to that described above for operations 720 and 740. In operation 1080, the touch input detector 610 detects (e.g., via, using, in conjunction with, or otherwise based on the display screen 101) that the touch-and-drag input that began within the first zone of the slider control 130 and entered the second zone of the slider control 130 has entered a third zone of the slider control 130. As noted above, the third zone may correspond to the sequentially third alphabetic letter 123 (e.g., "T") and may be visually aligned with the sequentially third alphabetic letter 123. This may be the case when the word 120 is three letters long or longer, including when the word 120 is a CVC word.

In operation 1082, the phoneme presentation generator 620 responds to the touch-and-drag input entering the third zone of the slider control 130 by presenting a third phoneme that corresponds to the sequentially third alphabetic letter 123 of the word 120. The presenting of the third phoneme may include performing or otherwise causing audio playback of the third phoneme (e.g., among other things). Specifically, such a presentation of the third phoneme may be performed in a manner similar to that described above for the second phoneme. For example, one or more operations analogous to any one or more of operations 840, 842, 940, and 942 may be performed for the third phoneme, as appropriate, in accordance with the above discussions of those operations.

Furthermore, in situations where the word 120 (e.g., "BABY") has a sequentially fourth alphabetic letter (e.g., "Y"), one or more operations analogous to operations 1080 and 1082 may be performed. For example, the touch input detectors 610 may detect that the touch-and-drag input that began within the first zone of the slider control 130, entered the second zone of the slider control 130, and entered the third zone of the slider control 130 has now entered a fourth zone of the slider control 130. The fourth zone may correspond to the sequentially fourth alphabetic letter 123 (e.g., "Y") and may be visually aligned with the sequentially fourth alphabetic letter.

Likewise, the phoneme presentation generator 620 may respond to the touch-and-drag input entering the fourth zone of the slider control 130 by presenting a fourth phoneme that corresponds to the sequentially fourth alphabetic letter (e.g., "Y") of the word 120. The presenting of the fourth phoneme may include performing or otherwise causing audio playback of the fourth phoneme (e.g., among other things). Such a presentation of the fourth phoneme may be performed in a manner similar to that described above for the second or third phoneme. For example, one or more operations analogous to any one or more of operations 840, 842, 940, and 942 may be performed for the fourth phoneme, as appropriate, in accordance with the above discussions of those operations.

According to various example embodiments, when the word 120 has five or more alphabetic letters, the additional alphabetic letters beyond the sequentially fourth alphabetic letter may be handled by the machine 100 in a manner similar to that described above for the sequentially fourth alphabetic letter.

According to various example embodiments, one or more of the methodologies described herein may facilitate variable-speed pronunciation of phonemes by the machine 100. Moreover, one or more of the methodologies described herein may facilitate technical improvements over other machines that pronounce phonemes or attempt to pronounce phonemes, including being more responsive to a user (e.g., as the user dynamically varies the speed of the touch-and-drag input), providing a greater degree of control (e.g., over the speed at which the word is pronounced) to the user, providing more natural sounding auditory feedback to the user (e.g., at high pronunciation speeds, at low pronunciation speeds, or both), providing more natural looking visual feedback (e.g., in the form of animated mouth movements presented on a display screen) to the user, enabling the user to quickly and conveniently experiment with several different pronunciation speeds for a word (e.g., by repeatedly pronouncing the word in response to repeated touch-and-drag inputs at different speeds), or any suitable combination thereof. Hence, one or more of the methodologies described herein may facilitate teaching or learning of reading skills, as well as enhance user enjoyment thereof, compared to capabilities of pre-existing systems and methods.

When these effects are considered in aggregate, one or more of the methodologies described herein may obviate a need for certain efforts or resources that otherwise would be involved in variable-speed pronunciation of phonemes or other tasks involved in teaching or learning of reading skills. Efforts expended by a user in performing these tasks may be reduced by use of (e.g., reliance upon) a special-purpose machine that implements one or more of the methodologies described herein. Computing resources used by one or more systems or machines (e.g., within a network environment) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 11:
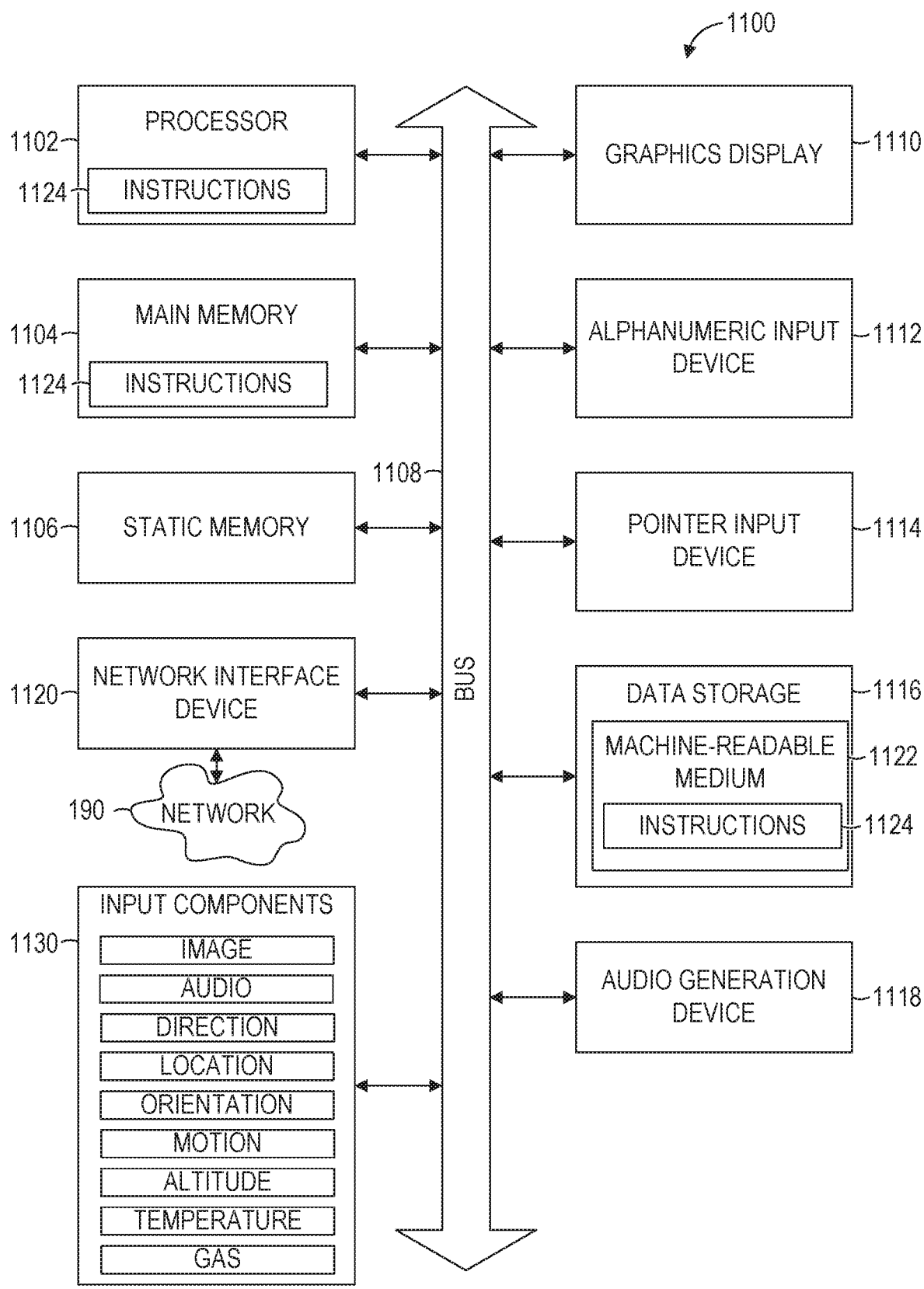
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be communicatively coupled (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1104, and a static memory 1106, which are configured to communicate with each other via a bus 1108. The processor 1102 contains solid-state digital microcircuits (e.g., electronic, optical, or both) that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein. In some example embodiments, the processor 1102 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1100 with at least the processor 1102, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a pointer input device 1114 (e.g., a mouse, a touchpad, a touchscreen, a trackball, a joystick, a stylus, a motion sensor, an eye tracking device, a data glove, or other pointing instrument), a data storage 1116, an audio generation device 1118 (e.g., a sound card, an amplifier, a speaker, a headphone jack, or any suitable combination thereof), and a network interface device 1120.

The data storage 1116 (e.g., a data storage device) includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the static memory 1106, within the processor 1102 (e.g., within the processor's cache memory), or any suitable combination thereof, before or during execution thereof by the machine 1100. Accordingly, the main memory 1104, the static memory 1106, and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device (e.g., a smart phone, a tablet computer, or a wearable device) and may have one or more additional input components 1130 (e.g., sensors or gauges). Examples of such input components 1130 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1130 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1124 for execution by the machine 1100 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1124).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:

presenting, by one or more processors of a machine, a graphical user interface (GUI) on a touch-sensitive display screen of a device, the GUI depicting a slider control aligned with a word that includes a sequentially first alphabetic letter and a sequentially second alphabetic letter, a first zone of the slider control corresponding to the sequentially first alphabetic letter of the word, a second zone of the slider control corresponding to the sequentially second alphabetic letter of the word;

detecting, via the touch-sensitive display screen and by one or more processors of the machine, a touch-and-drag input that begins within the first zone of the slider control and enters the second zone of the slider control;

by one or more processors of the machine and in response to the touch-and-drag input beginning within the first zone of the slider control, presenting a first phoneme that corresponds to the sequentially first alphabetic letter of the word, the presenting of the first phoneme including audio playback of the first phoneme; and by one or more processors of the machine and in response to the touch-and-drag input entering the second zone of the slider control, presenting a second phoneme that corresponds to the sequentially second alphabetic letter of the word, the presenting of the second phoneme including audio playback of the second phoneme.

A second example provides a method according to the first example, wherein:

the sequentially first alphabetic letter is a vowel, and the first phoneme is a vowel phoneme; and the presenting of the first phoneme includes sustaining the audio playback of the vowel phoneme by repeatedly looping at least a portion of the vowel phoneme as long as the touch-and-drag input remains within the first zone of the slider control. Thus, where the first letter of the word is a vowel, the presenting of the corresponding vowel phoneme is prolonged (e.g., performed for a prolonged duration) by the repeated looping of at least the portion of the vowel phoneme.

A third example provides a method according to the first example or the second example, wherein:

the sequentially second alphabetic letter is a vowel, and the second phoneme is a vowel phoneme; and the presenting of the second phoneme includes sustaining the audio playback of the vowel phoneme by repeatedly looping at least a portion of the vowel phoneme as long as the touch-and-drag input remains within the second zone of the slider control. Thus, where the second letter of the word is a vowel, the presenting of the corresponding vowel phoneme is prolonged (e.g., performed for a prolonged duration) by the repeated looping of at least the portion of the vowel phoneme.

A fourth example provides a method according to the first example, wherein:

the sequentially first alphabetic letter is a consonant, and the first phoneme is a consonant phoneme; and the presenting of the first phoneme includes, after the audio playback of the consonant phoneme, audio playback of silence as long as the touch-and-drag input remains within the first zone of the slider control. Thus, where the first letter of the word is a consonant, the presenting of the corresponding consonant phoneme is not prolonged but instead performed for a fixed duration by the repeated playback (e.g., by looping) of silence after the playback of the consonant phoneme.

A fifth example provides a method according to the first example or the fourth example, wherein:

the sequentially second alphabetic letter is a consonant, and the second phoneme is a consonant phoneme; and the presenting of the second phoneme includes, after the audio playback of the consonant phoneme, audio playback of silence as long as the touch-and-drag input remains within the second zone of the slider control. Thus, where the second letter of the word is a consonant, the presenting of the corresponding consonant phoneme is not prolonged but instead performed for a fixed duration by the repeated playback (e.g., by looping) of silence after the playback of the consonant phoneme.

A sixth example provides a method according to any of the first through fifth examples, wherein:

the detected touch-and-drag input has a duration and triggers a presenting of a pronunciation of the word coextensive with the duration of the touch-and-drag input; and the presenting of the pronunciation of the word includes the presenting of the first and second phonemes within the duration of the touch-and-drag input. Thus, where the touch-and-drag input is a swipe gesture, the duration of the swipe gesture determines the duration of the pronunciation of the full word in its entirety.

A seventh example provides a method according to any of the first through sixth examples, wherein:

the detected touch-and-drag input has a movement speed and triggers a presenting of a pronunciation of the word at a speech speed determined based on the movement speed of the touch-and-drag input; and the presenting of the pronunciation of the word includes the presenting of the first and second phonemes at the speech speed determined based on the movement speed of the touch-and-drag input. Thus, where the touch-and-drag input is a swipe gesture, the speed (e.g., velocity) of the swipe gesture determines the speed of the pronunciation of the full word in its entirety.

An eighth example provides a method according to any of the first through seventh examples, wherein:

the GUI further depicts an animated mouth;

the presenting of the first phoneme further includes displaying the animated mouth in a first mouth shape that corresponds to the first phoneme during the audio playback of the first phoneme; and the presenting of the second phoneme further includes displaying the animated mouth in a second mouth shape that corresponds to the second phoneme during the audio playback of the second phoneme. Thus, where an animated avatar or other animated character is depicted in the GUI, its animated mouth may change shape in accordance (e.g., in unison) with the audio playback of each sequential phoneme.

A ninth example provides a method according to any of the first through eighth examples, wherein:

the GUI depicts the word in a first color prior to the detecting of the touch-and-drag input;

the presenting of the first phoneme further includes depicting the sequentially first alphabetic letter of the word in a second color during the audio playback of the first phoneme; and the presenting of the second phoneme further includes depicting the sequentially second alphabetic letter of the word in the second color during the audio playback of the second phoneme. Accordingly, by extension, as each sequential letter of the word is pronounced, that letter may be highlighted by a corresponding change in color.

A tenth example provides a method according to any of the first through ninth examples, further comprising:

detecting, via the touch-sensitive display screen, a touch input on the sequentially first alphabetic letter of the word; and in response to the touch input, presenting the first phoneme that corresponds to the sequentially first alphabetic letter of the word, the presenting of the first phoneme including audio playback of the first phoneme. Accordingly, a user (e.g., a child who is learning to read) can touch each letter of the word (e.g., the first letter) one by one to hear its corresponding phoneme.

An eleventh example provides a method according to any of the first through tenth examples, further comprising:

detecting, via the touch-sensitive display screen, a touch input on the sequentially second alphabetic letter of the word; and in response to the touch input, presenting the second phoneme that corresponds to the sequentially second alphabetic letter of the word, the presenting of the second phoneme including audio playback of the second phoneme. Accordingly, a user (e.g., a child who is learning to read) can touch each letter of the word (e.g., the second letter) one by one to hear its corresponding phoneme.

A twelfth example provides a method according to any of the first through eleventh examples, wherein:

the word is a consonant-vowel-consonant word (e.g., "cat" or "dog") in which the sequentially first alphabetic letter is a first consonant, the sequentially second alphabetic letter is a vowel, and a sequentially third alphabetic letter is a second consonant;

the first phoneme is a first consonant phoneme, the second phoneme is a vowel phoneme, and the sequentially third alphabetic letter corresponds to a second consonant phoneme;

the presenting of the first phoneme includes, after the audio playback of the first consonant phoneme, audio playback of silence as long as the touch-and-drag input remains within the first zone of the slider control;

the presenting of the second phoneme includes sustaining the audio playback of the vowel phoneme by repeatedly looping at least a portion of the vowel phoneme as long as the touch-and-drag input remains within the second zone of the slider control; and the method further comprises:

detecting, via the touch-sensitive display screen, that the touch-and-drag input entered a third zone of the slider control, the third zone corresponding to the sequentially third alphabetic letter of the word; and in response to the touch-and-drag input entering the third zone of the slider control, presenting the second consonant phoneme that corresponds to the sequentially third alphabetic letter of the word, the presenting of the second consonant phoneme including audio playback of the second consonant phoneme followed by audio playback of silence as long as the touch-and-drag input remains within the third zone of the slider control. Accordingly, by extension, words longer than three letters may be pronounced in a similar manner (e.g., letter by letter, phoneme by phoneme, or both).

A thirteenth example provides a machine-readable medium (e.g., a non-transitory machine-readable storage medium) comprising instructions that, when executed by one or more processors of a machine, cause the machine to perform operations comprising:

presenting a graphical user interface (GUI) on a touch-sensitive display screen of a device, the GUI depicting a slider control aligned with a word that includes a sequentially first alphabetic letter and a sequentially second alphabetic letter, a first zone of the slider control corresponding to the sequentially first alphabetic letter of the word, a second zone of the slider control corresponding to the sequentially second alphabetic letter of the word;

detecting, via the touch-sensitive display screen, a touch-and-drag input that begins within the first zone of the slider control and enters the second zone of the slider control;

in response to the touch-and-drag input beginning within the first zone of the slider control, presenting a first phoneme that corresponds to the sequentially first alphabetic letter of the word, the presenting of the first phoneme including audio playback of the first phoneme; and in response to the touch-and-drag input entering the second zone of the slider control, presenting a second phoneme that corresponds to the sequentially second alphabetic letter of the word, the presenting of the second phoneme including audio playback of the second phoneme.

A fourteenth example provides a machine-readable medium according to the thirteenth example, wherein:
the sequentially first alphabetic letter is a consonant, and the first phoneme is a consonant phoneme; and
the presenting of the first phoneme includes, after the audio playback of the consonant phoneme, audio playback of silence as long as the touch-and-drag input remains within the first zone of the slider control. Thus, where the first letter of the word is a vowel, the presenting of the corresponding vowel phoneme is prolonged (e.g., performed for a prolonged duration) by the repeated looping of at least the portion of the vowel phoneme.

A fifteenth example provides a machine-readable medium according to the thirteenth example or the fourteenth example, wherein:
the sequentially second alphabetic letter is a vowel, and the second phoneme is a vowel phoneme; and
the presenting of the second phoneme includes sustaining the audio playback of the vowel phoneme by repeatedly looping at least a portion of the vowel phoneme as long as the touch-and-drag input remains within the second zone of the slider control. Thus, where the second letter of the word is a vowel, the presenting of the corresponding vowel phoneme is prolonged (e.g., performed for a prolonged duration) by the repeated looping of at least the portion of the vowel phoneme.

A sixteenth example provides a machine-readable medium according to any of the thirteenth through fifteenth examples, wherein:
the GUI further depicts an animated mouth;
the presenting of the first phoneme further includes displaying the animated mouth in a first mouth shape that corresponds to the first phoneme during the audio playback of the first phoneme; and
the presenting of the second phoneme further includes displaying the animated mouth in a second mouth shape that corresponds to the second phoneme during the audio playback of the second phoneme. Thus, where an animated avatar or other animated character is depicted in the GUI, its animated mouth may change shape in accordance (e.g., in unison) with the audio playback of each sequential phoneme.

A seventeenth example provides a system (e.g., a computer system or other data processing machine) comprising:
one or more processors; and
a memory storing instructions that, when executed by at least one processor among the one or more processors, cause the system to perform operations comprising:
presenting a graphical user interface (GUI) on a touch-sensitive display screen of a device, the GUI depicting a slider control aligned with a word that includes a sequentially first alphabetic letter and a sequentially second alphabetic letter, a first zone of the slider control corresponding to the sequentially first alphabetic letter of the word, a second zone of the slider control corresponding to the sequentially second alphabetic letter of the word;

detecting, via the touch-sensitive display screen, a touch-and-drag input that begins within the first zone of the slider control and enters the second zone of the slider control;

in response to the touch-and-drag input beginning within the first zone of the slider control, presenting a first phoneme that corresponds to the sequentially first alphabetic letter of the word, the presenting of the first phoneme including audio playback of the first phoneme; and in response to the touch-and-drag input entering the second zone of the slider control, presenting a second phoneme that corresponds to the sequentially second alphabetic letter of the word, the presenting of the second phoneme including audio playback of the second phoneme.

An eighteenth example provides a system according to the seventeenth example, wherein:
the sequentially second alphabetic letter is a vowel, and the second phoneme is a vowel phoneme; and
the presenting of the second phoneme includes sustaining the audio playback of the vowel phoneme by repeatedly looping at least a portion of the vowel phoneme as long as the touch-and-drag input remains within the second zone of the slider control. Thus, where the second letter of the word is a vowel, the presenting of the corresponding vowel phoneme is prolonged (e.g., performed for a prolonged duration) by the repeated looping of at least the portion of the vowel phoneme.

A nineteenth example provides a system according to the seventeenth example or the eighteenth example, wherein:
the detected touch-and-drag input has a duration and triggers a presenting of a pronunciation of the word coextensive with the duration of the touch-and-drag input; and
the presenting of the pronunciation of the word includes the presenting of the first and second phonemes within the duration of the touch-and-drag input. Thus, where the touch-and-drag input is a swipe gesture, the duration of the swipe gesture determines the duration of the pronunciation of the full word in its entirety.

A twentieth example provides a system according to any of the seventeenth through nineteenth examples, wherein:
the GUI further depicts an animated mouth;
the presenting of the first phoneme further includes displaying the animated mouth in a first mouth shape that corresponds to the first phoneme during the audio playback of the first phoneme; and
the presenting of the second phoneme further includes displaying the animated mouth in a second mouth shape that corresponds to the second phoneme during the audio playback of the second phoneme. Thus, where an animated avatar or other animated character is depicted in the GUI, its animated mouth may change shape in accordance (e.g., in unison) with the audio playback of each sequential phoneme.

A twenty-first example provides a carrier medium carrying machine-readable instructions for controlling a machine to carry out the operations (e.g., method operations) performed in any one of the previously described examples.

What is claimed is:
1. A method comprising:
presenting, by one or more processors of a machine, a graphical user interface (GUI) on a touch-sensitive display screen of a device, the GUI depicting a slider control aligned with a word that includes a sequentially first alphabetic letter and a sequentially second alphabetic letter, the word depicted in a first color, a first zone of the slider control corresponding to the sequentially first alphabetic letter of the word, a second zone of the slider control corresponding to the sequentially second alphabetic letter of the word, the slider control including a slidable element, the GUI depicting a mouth in a neutral shape that corresponds to no phoneme, the slidable element in the slider control and the neutral shape of the mouth both indicating zero progress attained in pronouncing the word;

detecting, via the touch-sensitive display screen and by one or more processors of the machine, a touch-and-drag input that begins within the first zone of the slider control and enters the second zone of the slider control;

by one or more processors of the machine and in response to the touch-and-drag input beginning within the first zone of the slider control, presenting a first phoneme that corresponds to the sequentially first alphabetic letter of the word, the presenting of the first phoneme including audio playback of the first phoneme and depicting the sequentially first alphabetic letter of the word in a second color during the audio playback of the first phoneme, the GUI depicting the mouth in a first non-neutral shape that corresponds to the first phoneme, the slidable element of the slider control indicating a first non-zero extent of progress attained in pronouncing the word;

by one or more processors of the machine and in response to the touch-and-drag input entering the second zone of the slider control, presenting a second phoneme that corresponds to the sequentially second alphabetic letter of the word, the presenting of the second phoneme including audio playback of the second phoneme and depicting the sequentially second alphabetic letter of the word in the second color during the audio playback of the second phoneme, the GUI depicting the mouth in a second non-neutral shape that corresponds to the second phoneme, the slidable element of the slider control indicating a second non-zero extent of progress greater than the first non-zero extent of progress attained in pronouncing the word; and by one or more processors of the machine and in response to the presenting the audio playback of the second phoneme, reverting the first alphabetic letter and the second alphabetic letter of the word from the second color to the first color.

2. The method of claim 1, wherein:
the sequentially first alphabetic letter is a vowel, and the first phoneme is a vowel phoneme; and
the presenting of the first phoneme includes sustaining the audio playback of the vowel phoneme by repeatedly looping at least a portion of the vowel phoneme as long as the touch-and-drag input remains within the first zone of the slider control.

3. The method of claim 1, wherein:
the sequentially second alphabetic letter is a vowel, and the second phoneme is a vowel phoneme; and
the presenting of the second phoneme includes sustaining the audio playback of the vowel phoneme by repeatedly looping at least a portion of the vowel phoneme as long as the touch-and-drag input remains within the second zone of the slider control.

4. The method of claim 1, wherein:
the sequentially first alphabetic letter is a consonant, and the first phoneme is a consonant phoneme; and
the presenting of the first phoneme includes, after the audio playback of the consonant phoneme, audio playback of silence as long as the touch-and-drag input remains within the first zone of the slider control.

5. The method of claim 1, wherein:
the sequentially second alphabetic letter is a consonant, and the second phoneme is a consonant phoneme; and
the presenting of the second phoneme includes, after the audio playback of the consonant phoneme, audio playback of silence as long as the touch-and-drag input remains within the second zone of the slider control.

6. The method of claim 1, wherein:
the detected touch-and-drag input has a duration and triggers a presenting of a pronunciation of the word coextensive with the duration of the touch-and-drag input; and
the presenting of the pronunciation of the word includes the presenting of the first and second phonemes within the duration of the touch-and-drag input.

7. The method of claim 1, wherein:
the detected touch-and-drag input has a movement speed and triggers a presenting of a pronunciation of the word at a speech speed determined based on the movement speed of the touch-and-drag input; and
the presenting of the pronunciation of the word includes the presenting of the first and second phonemes at the speech speed determined based on the movement speed of the touch-and-drag input.

8. The method of claim 1, wherein:
the GUI depicts the word in a first color prior to the detecting of the touch-and-drag input;
the presenting of the first phoneme further includes depicting the sequentially first alphabetic letter of the word in a second color during the audio playback of the first phoneme; and
the presenting of the second phoneme further includes depicting the sequentially second alphabetic letter of the word in the second color during the audio playback of the second phoneme.

9. The method of claim 1, further comprising:
detecting, via the touch-sensitive display screen, a touch input on the sequentially first alphabetic letter of the word; and
in response to the touch input, presenting the first phoneme that corresponds to the sequentially first alphabetic letter of the word, the presenting of the first phoneme including audio playback of the first phoneme.

10. The method of claim 1, further comprising:
detecting, via the touch-sensitive display screen, a touch input on the sequentially second alphabetic letter of the word; and
in response to the touch input, presenting the second phoneme that corresponds to the sequentially second alphabetic letter of the word, the presenting of the second phoneme including audio playback of the second phoneme.

11. The method of claim 1, wherein:
the word is a consonant-vowel-consonant word in which the sequentially first alphabetic letter is a first consonant, the sequentially second alphabetic letter is a vowel, and a sequentially third alphabetic letter is a second consonant;
the first phoneme is a first consonant phoneme, the second phoneme is a vowel phoneme, and the sequentially third alphabetic letter corresponds to a second consonant phoneme;
the presenting of the first phoneme includes, after the audio playback of the first consonant phoneme, audio playback of silence as long as the touch-and-drag input remains within the first zone of the slider control;

the presenting of the second phoneme includes sustaining the audio playback of the vowel phoneme by repeatedly looping at least a portion of the vowel phoneme as long as the touch-and-drag input remains within the second zone of the slider control; and the method further comprises:

detecting, via the touch-sensitive display screen, that the touch-and-drag input entered a third zone of the slider control, the third zone corresponding to the sequentially third alphabetic letter of the word; and in response to the touch-and-drag input entering the third zone of the slider control, presenting the second consonant phoneme that corresponds to the sequentially third alphabetic letter of the word, the presenting of the second consonant phoneme including audio playback of the second consonant phoneme followed by audio playback of silence as long as the touch-and-drag input remains within the third zone of the slider control.

12. A non-transitory machine-readable storage medium comprising instructions that, when executed by one or more processors of a machine, cause the machine to perform operations comprising:

presenting a graphical user interface (GUI) on a touch-sensitive display screen of a device, the GUI depicting a slider control aligned with a word that includes a sequentially first alphabetic letter and a sequentially second alphabetic letter, the word depicted in a first color, a first zone of the slider control corresponding to the sequentially first alphabetic letter of the word, a second zone of the slider control corresponding to the sequentially second alphabetic letter of the word, the slider control including a slidable element, the GUI depicting a mouth in a neutral shape that corresponds to no phoneme, the slidable element in the slider control and the neutral shape of the mouth both indicating zero progress attained in pronouncing the word;

detecting, via the touch-sensitive display screen, a touch-and-drag input that begins within the first zone of the slider control and enters the second zone of the slider control;

in response to the touch-and-drag input beginning within the first zone of the slider control, presenting a first phoneme that corresponds to the sequentially first alphabetic letter of the word, the presenting of the first phoneme including audio playback of the first phoneme and depicting the sequentially first alphabetic letter of the word in a second color during the audio playback of the first phoneme, the GUI depicting the mouth in a first non-neutral shape that corresponds to the first phoneme, the slidable element of the slider control indicating a first non-zero extent of progress attained in pronouncing the word;

in response to the touch-and-drag input entering the second zone of the slider control, presenting a second phoneme that corresponds to the sequentially second alphabetic letter of the word, the presenting of the second phoneme including audio playback of the second phoneme and depicting the sequentially second alphabetic letter of the word in the second color during the audio playback of the second phoneme, the GUI depicting the mouth in a second non-neutral shape that corresponds to the second phoneme, the slidable element of the slider control indicating a second non-zero extent of progress greater than the first non-zero extent of progress attained in pronouncing the word; and in response to the presenting the audio playback of the second phoneme, reverting the first alphabetic letter and the second alphabetic letter of the word from the second color to the first color.

13. The non-transitory machine-readable storage medium of claim 12, wherein:

the sequentially first alphabetic letter is a consonant, and the first phoneme is a consonant phoneme; and the presenting of the first phoneme includes, after the audio playback of the consonant phoneme, audio playback of silence as long as the touch-and-drag input remains within the first zone of the slider control.

14. The non-transitory machine-readable storage medium of claim 12, wherein:

the sequentially second alphabetic letter is a vowel, and the second phoneme is a vowel phoneme; and the presenting of the second phoneme includes sustaining the audio playback of the vowel phoneme by repeatedly looping at least a portion of the vowel phoneme as long as the touch-and-drag input remains within the second zone of the slider control.

15. The non-transitory machine-readable storage medium of claim 12, wherein:

the neutral shape of the mouth that indicates zero progress attained in pronouncing the word is expressionless and with closed lips.

16. A system comprising:

one or more processors; and a memory storing instructions that, when executed by at least one processor among the one or more processors, cause the system to perform operations comprising:

presenting a graphical user interface (GUI) on a touch-sensitive display screen of a device, the GUI depicting a slider control aligned with a word that includes a sequentially first alphabetic letter and a sequentially second alphabetic letter, the word depicted in a first color, a first zone of the slider control corresponding to the sequentially first alphabetic letter of the word, a second zone of the slider control corresponding to the sequentially second alphabetic letter of the word, the slider control including a slidable element, the GUI depicting a mouth in a neutral shape that corresponds to no phoneme, the slidable element in the slider control and the neutral shape of the mouth both indicating zero progress attained in pronouncing the word;

detecting, via the touch-sensitive display screen, a touch-and-drag input that begins within the first zone of the slider control and enters the second zone of the slider control;

in response to the touch-and-drag input beginning within the first zone of the slider control, presenting a first phoneme that corresponds to the sequentially first alphabetic letter of the word, the presenting of the first phoneme including audio playback of the first phoneme and depicting the sequentially first alphabetic letter of the word in a second color during the audio playback of the first phoneme, the GUI depicting the mouth in a first non-neutral shape that corresponds to the first phoneme, the slidable element of the slider control indicating a first non-zero extent of progress attained in pronouncing the word;

in response to the touch-and-drag input entering the second zone of the slider control, presenting a second phoneme that corresponds to the sequentially second alphabetic letter of the word, the presenting of the second phoneme including audio playback of the second phoneme and depicting the sequentially second alphabetic letter of the word in the second color during the audio playback of the second phoneme, the GUI depicting the mouth in a second non-neutral shape that corresponds to the second phoneme, the slidable element of the slider control indicating a second non-zero extent of progress greater than the first non-zero extent of progress attained in pronouncing the word; and in response to the presenting the audio playback of the second phoneme, reverting the first alphabetic letter and the second alphabetic letter of the word from the second color to the first color.

17. The system of claim 16, wherein:

the sequentially second alphabetic letter is a vowel, and the second phoneme is a vowel phoneme; and the presenting of the second phoneme includes sustaining the audio playback of the vowel phoneme by repeatedly looping at least a portion of the vowel phoneme as long as the touch-and-drag input remains within the second zone of the slider control.

18. The system of claim 16, wherein:

the detected touch-and-drag input has a duration and triggers a presenting of a pronunciation of the word coextensive with the duration of the touch-and-drag input; and the presenting of the pronunciation of the word includes the presenting of the first and second phonemes within the duration of the touch-and-drag input.

19. The system of claim 16, wherein:

the neutral shape of the mouth that indicates zero progress attained in pronouncing the word is expressionless and with closed lips.

\* \* \* \* \*

UNITED STATES PATENT AND TRADEMARK OFFICE
CERTIFICATE OF CORRECTION

PATENT NO. : 11,361,760 B2
APPLICATION NO. : 16/219659
DATED : June 14, 2022
INVENTOR(S) : Blau-Mccandliss et al.

Page 1 of 1

It is certified that error appears in the above-identified patent and that said Letters Patent is hereby corrected as shown below:

On the Title Page

On page 2, in Column 2, under "Other Publications", Line 6, delete "19896169,0," and insert --19896169.0,-- therefor In the Specification In Column 2, Line 3, after "subject", insert --matter--

In Column 5, Line 15, delete "122." and insert --122-- therefor

In Column 7, Line 18, delete "110," and insert --100,-- therefor

In Column 7, Line 57, delete "110," and insert --100,-- therefor

In Column 9, Line 38, delete "128" and insert --120-- therefor

In Column 12, Line 15, after "letter", delete "123"

Signed and Sealed this
Thirty-first Day of January, 2023

Katherine Kelly Vidal
*Director of the United States Patent and Trademark Office*